(12) United States Patent
Miller et al.

(10) Patent No.: US 11,605,144 B1
(45) Date of Patent: Mar. 14, 2023

(54) SYSTEM AND METHODS FOR PLANNING AND OPTIMIZING THE RECOVERY OF CRITICAL INFRASTRUCTURE/KEY RESOURCES

(71) Applicant: Priority 5 Holdings, Inc., Needham, MA (US)

(72) Inventors: Charles Q. Miller, Medfield, MA (US); Allen D. Bierbaum, Ames, IA (US); Donald D. Dudenhoeffer, Idaho Falls, ID (US); Aron L. Bierbaum, Ankeny, IA (US)

(73) Assignee: Priority 5 Holdings, Inc., Needham, MA (US)

( * ) Notice: Subject to any disclaimer, the term of this patent is extended or adjusted under 35 U.S.C. 154(b) by 380 days.

(21) Appl. No.: 16/789,980

(22) Filed: Feb. 13, 2020

Related U.S. Application Data

(63) Continuation of application No. 14/091,599, filed on Nov. 27, 2013, now abandoned.

(60) Provisional application No. 61/731,114, filed on Nov. 29, 2012.

(51) Int. Cl.
| | |
|---|---|
| *G06Q 10/06* | (2012.01) |
| *G06Q 50/26* | (2012.01) |
| *G06Q 10/0631* | (2023.01) |
| *G06Q 10/0635* | (2023.01) |

(52) U.S. Cl.
CPC ....... *G06Q 50/26* (2013.01); *G06Q 10/06311* (2013.01); *G06Q 10/06315* (2013.01); *G06Q 10/0635* (2013.01)

(58) Field of Classification Search
CPC ............ G06Q 10/06; G06Q 10/06315; G06Q 10/06313; G06Q 10/0635
USPC .......................................................... 705/7.25
See application file for complete search history.

(56) References Cited

U.S. PATENT DOCUMENTS

| | | |
|---|---|---|
| 7,325,161 B1 | 1/2008 | Rakic et al. |
| 2004/0015374 A1 | 1/2004 | Hager |
| 2006/0167728 A1* | 7/2006 | Siegel ................ G06F 3/04855 705/7.33 |

(Continued)

FOREIGN PATENT DOCUMENTS

| | | | |
|---|---|---|---|
| WO | WO 0108035 | * | 2/2001 |

*Primary Examiner* — Renae Feacher
(74) *Attorney, Agent, or Firm* — Culhane Meadows PLLC; Orlando Lopez

(57) ABSTRACT

Methods and system for planning and optimizing the recovery of critical infrastructure resources, where the method includes determining, from execution of a computer readable code, impact of at least one predetermined environmental condition on a number of critical infrastructure resources subjected to said predetermined environmental conditions and on other critical infrastructure resources dependent on said number of critical infrastructure resources, each of the number of critical infrastructure resources having rules for impact of predetermined environmental conditions and for recovery time, obtaining, from execution of the computer readable code, deployment information for predetermined Recovery Assets, each one of the predetermined Recovery Assets being staged, before deployment, at a predetermined staging location, and obtaining, from execution of the computer readable code, resulting consequences from deployment of the predetermined Recovery Assets.

8 Claims, 20 Drawing Sheets

(56) References Cited

U.S. PATENT DOCUMENTS

| | | | |
|---|---|---|---|
| 2006/0224797 A1* | 10/2006 | Parish | G08B 31/00 710/62 |
| 2007/0021954 A1* | 1/2007 | El-Damhougy | G06F 13/387 703/21 |
| 2008/0172262 A1 | 7/2008 | An et al. | |
| 2008/0172286 A1 | 7/2008 | Ramanujan et al. | |
| 2010/0043074 A1* | 2/2010 | Scates | G06F 21/577 726/25 |
| 2010/0287010 A1 | 11/2010 | Batot et al. | |
| 2011/0016088 A1 | 1/2011 | Spackman | |
| 2011/0022538 A1 | 1/2011 | Jin et al. | |
| 2011/0173045 A1 | 7/2011 | Jaine | |
| 2011/0173146 A1 | 7/2011 | Hnatio | |
| 2011/0181443 A1* | 7/2011 | Gutierrez | G01C 21/3697 340/990 |
| 2011/0231221 A1 | 9/2011 | Worwetz et al. | |
| 2012/0134527 A1* | 5/2012 | Culp | G06V 10/42 382/100 |
| 2013/0174259 A1* | 7/2013 | Pearcy | H04L 41/00 726/25 |
| 2014/0137257 A1 | 5/2014 | Martinez et al. | |

\* cited by examiner

FIG. 4B

SYSTEM AND METHODS FOR PLANNING AND OPTIMIZING THE RECOVERY OF CRITICAL INFRASTRUCTURE/KEY RESOURCES

CROSS REFERENCE TO RELATED APPLICATIONS

This application is a continuation of U.S. patent application Ser. No. 14/091,599, entitled SYSTEMS AND METHODS FOR PLANNING AND OPTIMIZING THE RECOVERY OF CRITICAL INFRASTRUCTURE/KEY RESOURCES, filed on Nov. 27, 2013, which claims priority of U.S. Provisional Application No. 61/731,114, filed Nov. 29, 2012, entitled SYSTEM AND METHOD FOR PLANNING AND OPTIMIZING THE RECOVERY OF CRITICAL INFRASTRUCTURE/KEY RESOURCES, both of which are incorporated by reference herein in their entirety for all purposes.

BACKGROUND

These teachings relate generally to systems and methods for planning and optimizing the recovery of critical infrastructure/key resources that may be damaged as a result of predetermined occurrences.

Determining the best use of limited resources by governmental authorities or other organizations when planning in preparation for restoring to operability critical infrastructure and key resources (CI/KR, also referred to, hereinbelow, as critical infrastructure resources) that may be damaged by an unintended occurrence (or when assessing the best use of limited resources when undertaking efforts to restore to operation CI/KR that have actually been damaged in an unintended occurrence) requires that the effects of multiple potential threats and hazards across the entire community or organization be compared to determine the best practices to be employed to prepare for, prevent, respond to, and restore operations following, unintended occurrences that damage CI/KR, whether those occurrences are caused by nature or otherwise. It also requires that the use of such resources take into account the independent use by other organizations of their own Recovery Assets in responding to such threats and hazards, and also take into account the priorities determined in advance or at the time by the community or organization. While Priority 5's Touch Assisted Command and Control System (TACCS™) (see U.S. patent application Ser. No. 12/208,738, which is incorporated by reference herein in its entirety and for all purposes) software can be utilized by appropriate computer systems to determine the impact of threats and hazards and to determine best practices for prevention, protection, and response, no system is currently available to determine the best use of Recovery Assets in a way that optimizes recovery efforts while (1), incorporating priorities that may be imposed by a community or organization, or may be derived from processes, including processes such as the Threat and Hazard Identification and Risk Assessment (THIRA) employed by a community or another organization, and (2) taking into account the possible utilization of Recovery Assets under the control of third parties or possible additional Recovery Assets. The lack of a system and methodology by which disaster or other recovery efforts can be optimized in a manner that is approved or directed by a governmental authority or an organization, while taking into account all available Recovery Assets (including those under the control of third parties), has resulted in repeated errors in preparing for and responding to unintended occurrences. A recent widely publicized example in the aftermath of Hurricane Katrina was the decision by FEMA to deploy a potable water distribution station in the parking lot of a Wal-Mart that had already been restored to operation and was in fact offering bottled water to patrons.

There is a need for methods and systems for planning and optimizing the recovery of critical infrastructure/key resources that may be damaged as a result of unintended occurrences.

BRIEF SUMMARY

Methods and systems for planning and optimizing the recovery of critical infrastructure/key resources that may be damaged as a result of unintended occurrences are disclosed herein below.

In one or more embodiments, the method of these teachings includes determining, from execution of a computer readable code, impact of one or more predetermined environmental conditions on one or more critical infrastructure resources (CI/KR) subjected to the one or more predetermined environmental conditions and on other critical infrastructure resources dependent on the one or more critical infrastructure resources, each of the one or more critical infrastructure resources having rules for impact of predetermined environmental conditions and for recovery time, obtaining, from execution of the computer readable code, deployment information for predetermined Recovery Assets, each one of the predetermined Recovery Assets being staged, before deployment, at a predetermined staging location, and obtaining, from execution of the computer readable code, resulting consequences from deployment of the predetermined Recovery Assets.

In one or more embodiments, the system of these teachings includes one or more processors and one or more computer usable media having computer readable code embodied therein, which when executed in the one or more processors causes the one or more processors to perform the method of these teachings.

Other embodiments of the method and system of these teachings are disclosed herein below.

For a better understanding of the present teachings, together with other and further objects thereof, reference is made to the accompanying drawings and detailed description and its scope will be pointed out in the appended claims.

BRIEF DESCRIPTION OF THE DRAWINGS

FIG. 4 is a description (as seen in a screenshot) of the resource vulnerability in one embodiment of the method of these teachings;

FIG. 4a illustrates use of the description of the resource vulnerability in order to enter vulnerabilities and rules in one embodiment of the method of these teachings;

FIG. 4b illustrates another example of use of the description of the resource vulnerability in order to enter vulnerabilities and rules in one embodiment of the method of these teachings;

DETAILED DESCRIPTION

Figure 1:
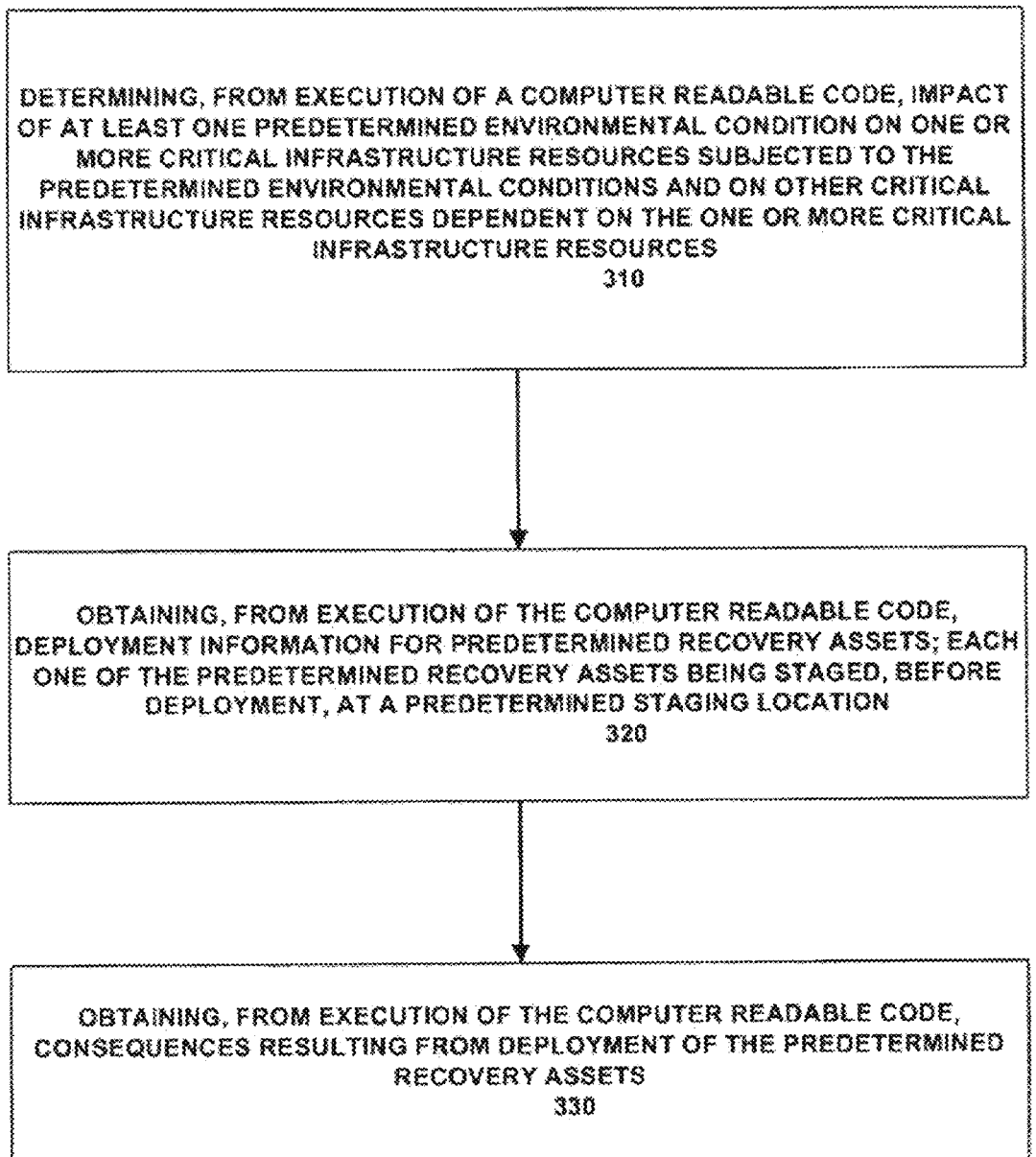
FIG. 1 is a schematic flow diagram representation of an embodiment of the method of these teachings.

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

"Predetermined environmental conditions," as used herein, includes acts of nature, such as floods, hurricanes, ice storms, snow storms, natural phenomena started by actors, whether human or not, such as fires, etc., and phenomena are caused by actors, such as acts of terrorism, vandalism, etc.

In one or more embodiments, the method of these teachings includes determining, from execution of a computer readable code, impact of one or more environmental conditions on one or more critical infrastructure resources subjected to the one or more environmental conditions and on other critical infrastructure resources dependent on the one or more critical infrastructure resources, each of the one or more critical infrastructure resources having rules for impact of predetermined environmental conditions and for recovery time, obtaining, from execution of the computer readable code, deployment information for predetermined Recovery Assets, each one of the predetermined Recovery Assets being staged, before deployment, at a predetermined staging location, and obtaining, from execution of the computer readable code, resulting consequences from deployment of the predetermined Recovery Assets for the predetermined environmental conditions.

In one or more instances, the deployment information includes deployment of emergency resources. In other instances, the method also includes modifying the deployment information for the predetermined Recovery Assets, and obtaining new resulting consequences. In one embodiment, modifying the deployment information includes making available other Recovery Assets.

In one or more instances, determining impact of the one or more predetermined environmental conditions includes creating a network for each critical infrastructure resource, wherein each critical infrastructure resource is connected to other assets upon which its continued operation depends, integrating networks of dependencies and interdependencies across number of critical infrastructure resources, after the networks are completed for the number of critical infrastructure resources, and imposing the one or more environmental conditions over a geographic area containing at least one of the number of critical infrastructure resources. In one instance, in the above disclosed steps used for determining impact of the environmental conditions or in the above disclosed embodiment of the method of these teachings, the number of critical infrastructure resources and the other critical infrastructure resources are identified without using critical decision points (CDPs), CDPs being identified moments where a decision has greater potential to affect an outcome.

In one embodiment, the one or more predetermined environmental conditions correspond to actual one or more predetermined environmental conditions. In that embodiment, planning and optimizing the recovery of critical infrastructure resources corresponds to disaster relief planning. In other embodiments, wherein the one or more predetermined environmental conditions are provided as an scenario, planning and optimizing the recovery of critical infrastructure resources corresponds to emergency relief planning, Threat and Hazard Identification and Risk Assessment (THIRA), and asset management or evaluation.

FIG. 1 is a schematic flow diagram representation of an embodiment of the method of these teachings. Referring to FIG. 1, in the embodiment shown therein, after execution of the computer readable code, where the computer readable code includes an event simulation code (such as the Touch Assisted Command and Control System (TACCS™) which is disclosed in U.S. patent application Ser. No. 12/208,738), impact of one or more predetermined environmental conditions on a one or more critical infrastructure resources subjected to the predetermined environmental conditions is determined (step 310, FIG. 1). The critical infrastructure resources include those that are directly affected by the predetermined environmental conditions and those are dependent on the directly affected critical infrastructure resources. Each of the critical infrastructure resources has rules for the impact of the environmental condition, for the required Recovery Assets and for the required time for recovery. After determining the impact, from execution of the computer readable code, deployment information is obtained for predetermined Recovery Assets (step 320, FIG. 1). Staging information for each of the predetermined Recovery Assets has been previously provided, placing each to determined Recovery Assets at a predetermined staging location. The deployment, in the execution of the computer readable code, can be determined by predetermined priorities. Once the Recovery Assets have been deployed, consequences resulting from the deployment are obtained, from execution of the computer readable code (step 330, FIG. 1). The deployment information can include deployment of emergency resources (such as, but not limited to, backup power generators, etc.).

The consequences resulting from the deployment can be analyzed to determine whether that outcome is acceptable. The outcomes can be changed by modifying the deployment of the predetermined Recovery Assets and the modification can include increasing the number of Recovery Assets. The predetermined priorities can be modified in order to modify the outcome.

In one or more embodiments, the system of these teachings includes one or more processors and one or more computer usable media having computer readable code embodied therein, which when executed in the one or more processors causes the one or more processors to perform the method of these teachings.

Figure 3:
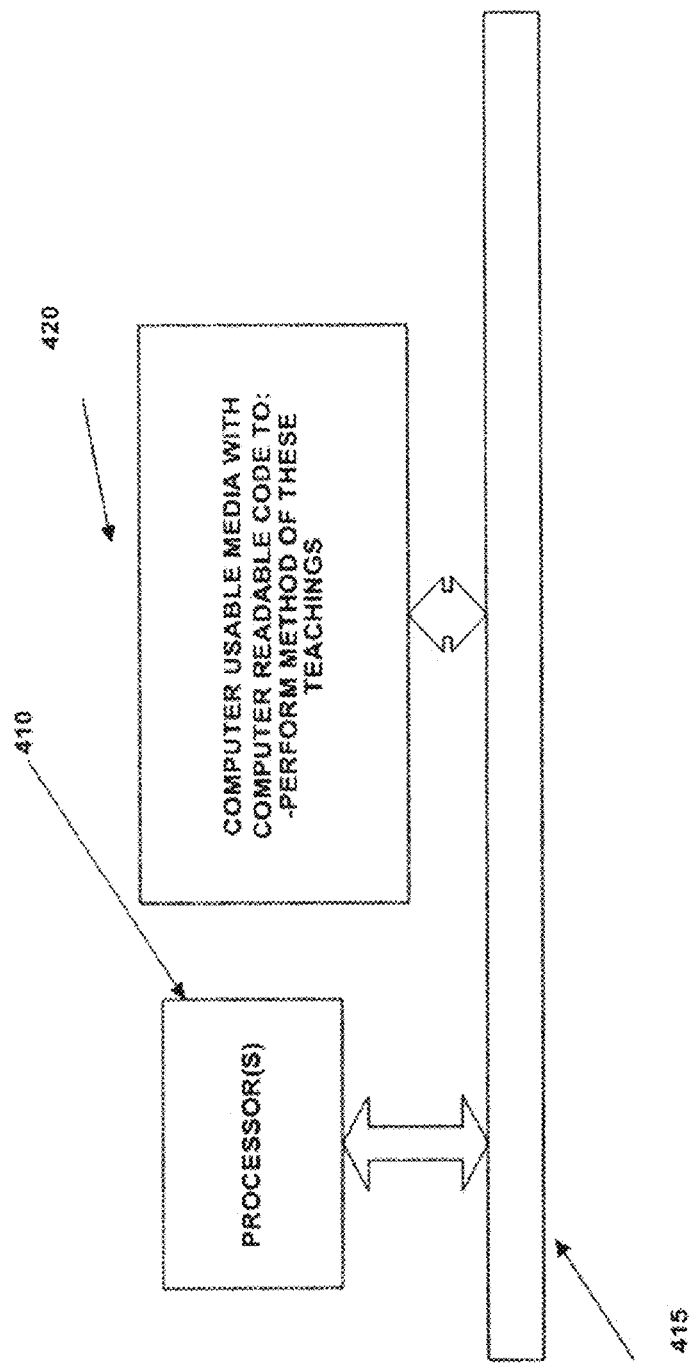
FIG. 3 is a schematic block diagram representation of an embodiment the system of these teachings.

FIG. 3 is a schematic block diagram representation of an embodiment the system of these teachings. Referring to FIG. 3, in the embodiment shown therein, one or more processors 410 are operatively connected to computer usable media 420 that has computer readable code embodied therein, which when executed by the processors 410 causes of processors to perform their method of these teachings, in one embodiment, the method disclosed hereinabove. The one or more processors are operatively connected to the computer usable media 420 by a computer interconnection component 415 (such as a computer bus).

In one embodiment, when the computer readable code of these teachings, including an event simulation code, is executed, an initial recovery plan is obtained that includes identifying community critical assets and key resources, mapping their interdependencies, and revealing their vulnerabilities to conditions created by various threats and hazards.

Figure 7:
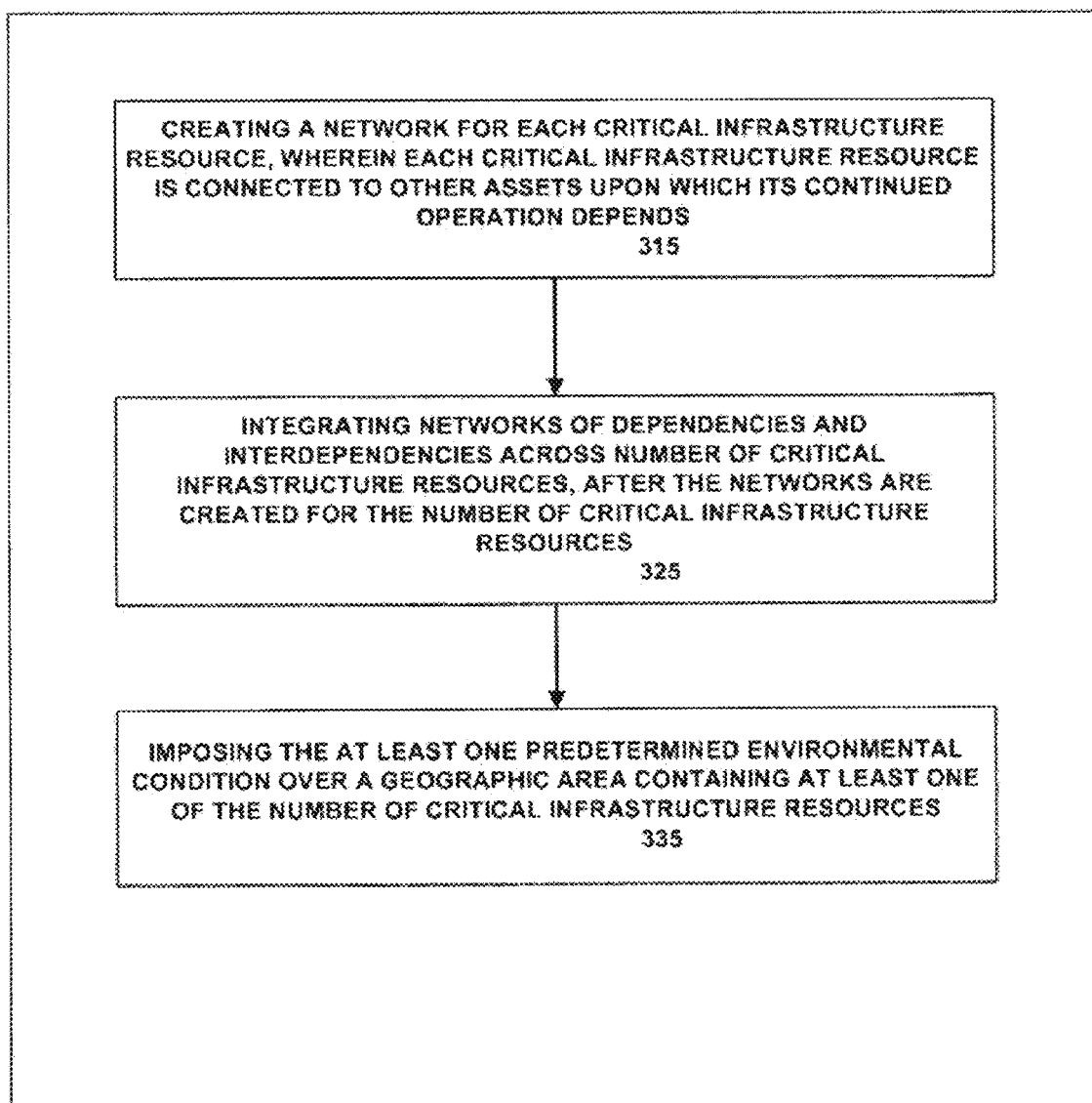
FIG. 7 is a schematic block diagram representation of one instance of a step in an embodiment the system of these teachings.

FIG. 7 is a schematic flow diagram representation of an instance of the step of determining the impact of one or more predetermined environmental conditions on a number of critical infrastructure resources (step 310, FIG. 1). In the embodiment shown in FIG. 7, determining the impact of one or more predetermined environmental conditions includes creating a network for each critical infrastructure resource, wherein each critical infrastructure resource is connected to other assets upon which its continued operation depends (step 315, FIG. 7), integrating networks of dependencies and interdependencies across number of critical infrastructure resources, after the networks are created for the number of critical infrastructure resources (step 325, FIG. 7), and imposing the one or more predetermined environmental conditions over a geographic area containing one or more of the number of critical infrastructure resources (step 335, FIG. 7). Each of the steps in the instance shown in FIG. 7 are performed by executing, by means of one or more processors, the computer readable code.

The system and method of these teachings are, in one embodiment, implemented using a computer or network of computers and computer readable code, embodied in a computer usable medium, that uses relevant information obtaining one or more database and relevant geospatial information (location information, effectively longitude and latitude), description of the assets and the asset dependencies, for an event driven simulation of the behavior of the assets. Although these teachings are not limited to the exemplary embodiment, in one exemplary embodiment the system and methods are implemented using the Touch Assisted Command and Control System (TACCS™) which is disclosed in U.S. patent application Ser. No. 12/208,738, which is incorporated by reference herein in its entirety and for all purposes.

Exemplification

In order to better elucidate the present teachings, at exemplary embodiments is presented below. It should be noted that these teachings are not limited to only the exemplary embodiment. For example, other event driven simulation computer readable code, similar to the Touch Assisted Command and Control System (TACCS™) used in the exemplary embodiment, can also be used in the method and system of these teachings.

For reference, a description of the Touch Assisted Command and Control System (TACCS™) as disclosed in U.S. patent application Ser. No. 12/208,738, is provided herein below.

The Touch Assisted Command and Control System

Touch Assisted Command and Control System (TACCS™) is a geospatial software platform that enables decision-makers to aggregate information from disparate sources, identify adverse conditions, quickly determine and test different responsive actions, and monitor the implementation and effectiveness of those actions. TACCS™ fuses knowledge of current operational status with powerful consequence analysis functionality, delivering a real time geospatial framework that provides command and control functionality.

Figure 11:
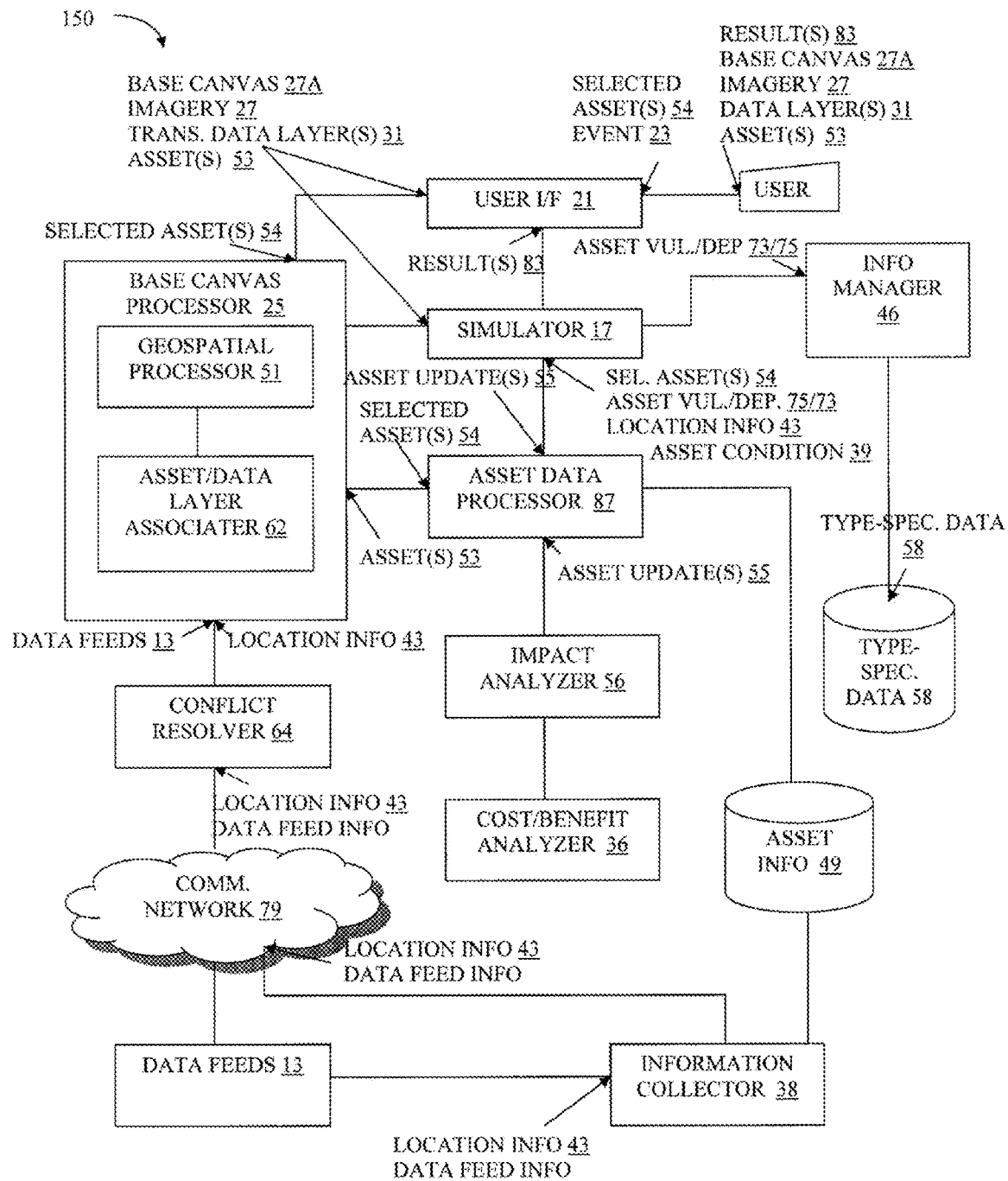
FIG. 11 is a schematic block diagram of the components of the event system used in the exemplary embodiment of these teachings.

FIG. 11 is a schematic block diagram of the components of the Touch Assisted Command and Control system. Referring now to FIG. 11, system 150 for training personnel to respond to event 23, or for creating and testing policies and procedures to respond to event 23, or for responding to event 23 can include, but is not limited to including, information collector 38 determining location information 43 and assets 53 associated with event 23, base canvas processor 25 creating base canvas 27A using at least one data feed 13, location information 43, and information associated with assets 53. Base canvas 27A can have imagery 27 and at least one data layer 31 that is overlain upon base canvas 27A. Base canvas processor 25 can continuously update at least one data layer 31 with information from at least one data feed 13. System 150 can further include geospatial processor 51 correlating and geospatially aligning at least one data layer 31 with imagery 27 and base canvas 27A according to location information 43. System 150 can also include asset/data layer associater 62 identifying assets 53 associated with location information 43 and associating assets 53 with at least one data layer 31, user interface 21 receiving selected assets 54 from assets 53 from a user who is interfacing with at least one data layer 31 provided by base canvas processor 25 while base canvas processor 25 aggregates data from at least one data feed 13 associated with assets 53, and asset data processor 87 identifying asset dependencies 73 and asset vulnerabilities 75 associated with selected assets 54. System 150 can still further include an interdependency network used by simulator 17 which simulates event 23 based on selected assets 54, location information 43, asset condition 39, base canvas 27A, at least one data layer 31, asset vulnerabilities 75, asset dependencies 73, and asset behaviors. Simulator 17 can update asset conditions 39 based on the simulation, and simulator 17 can send results 83 of the simulation to user interface 21. Simulator 17 can continue the simulation until the training is complete, or until the policies and procedures are created or tested, or until the event has concluded.

Figure 12:
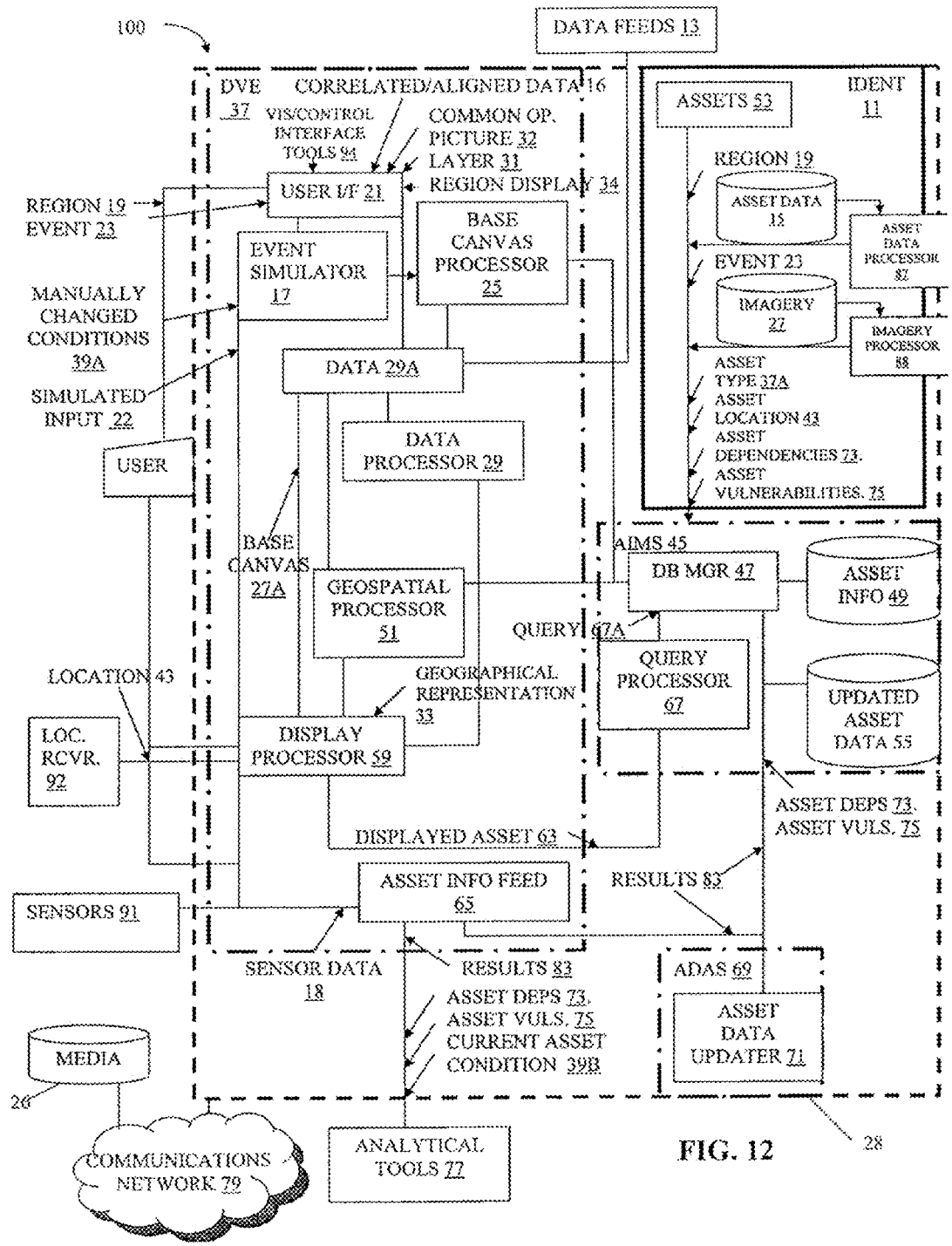
FIG. 12 is a schematic block diagram of an exemplary embodiment of the event system.

Continuing to refer primarily to FIG. 11, system 150 can optionally include information manager 46 grouping assets 53 according to an asset type 37A, automatically deriving dependency, vulnerability, and behavior information from assets 53 based on asset type 37A (FIG. 2), and storing dependency, vulnerability, and behavior information as asset-specific or type-specific data 58 on computer-readable medium 26 (FIG. 12). System 150 can further optionally include conflict resolver 64 identifying and resolving conflicts among information received from a plurality of data feeds 13, each containing analysis information. Base canvas processor 25 can superimpose the resolved data feeds on at least one data layer 31. System 150 can also optionally include impact analyzer 56 anticipating at least one impact based on asset condition 39, asset dependencies 73, asset vulnerabilities 75, and asset behaviors, updating asset conditions 39 according to an effect of at least one impact on selected assets 54, and providing a notification to the user by flagging assets 53 with changed data or changed asset conditions. Simulator 17 can simulate event 23 based on selected assets 54, location information 43, asset condition 39, and updated assets 55, and can update updated assets 55 and asset condition 39 based on the simulation. System 150 can optionally include cost/benefit analyzer 36 choosing a change to selected assets 54 based on a cost/benefit analysis of updated assets 55.

Figure 2:
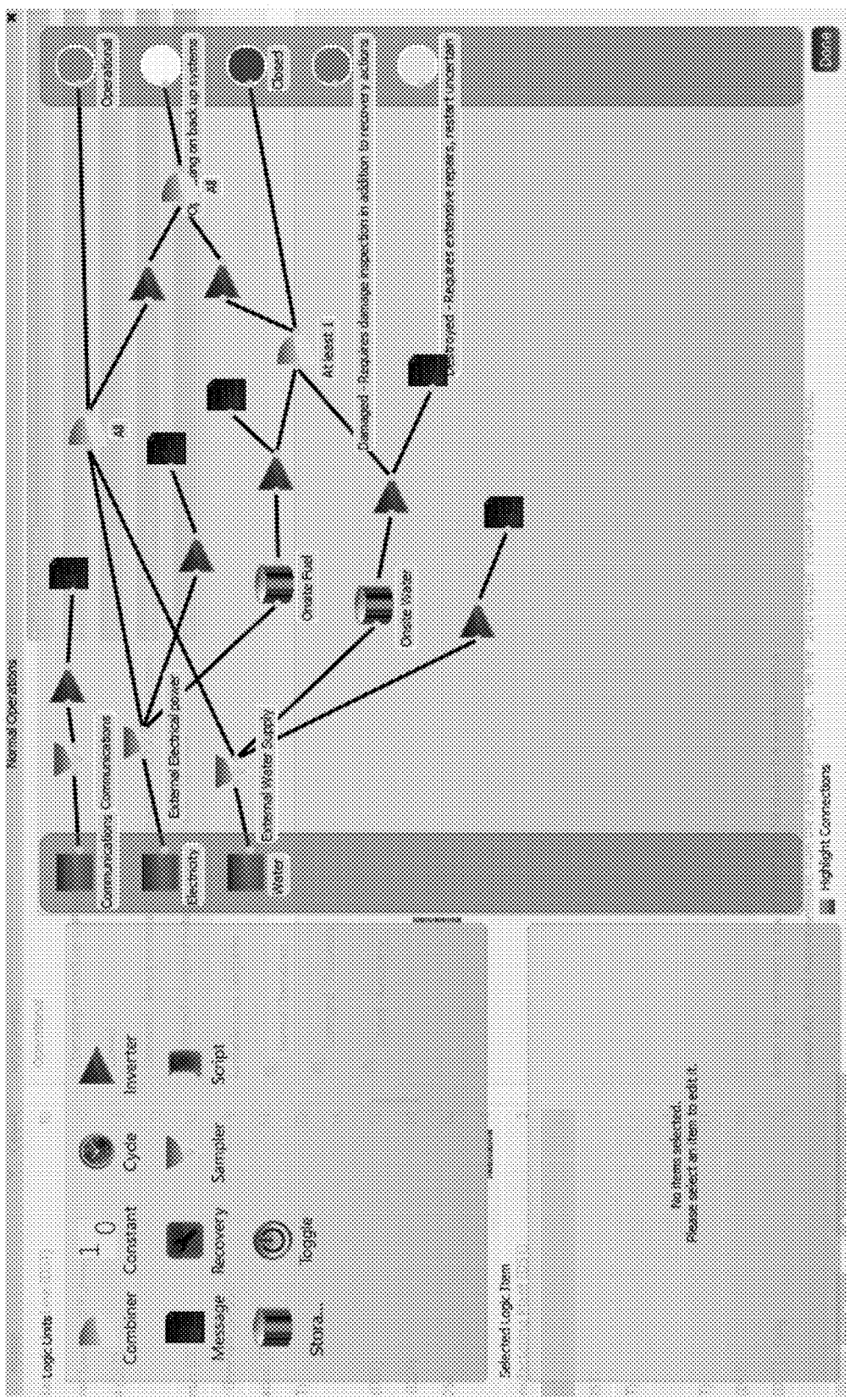
FIG. 2 shows the logic diagram that implements the rules for a particular resource in one embodiment of the method of these teachings.

FIG. 12 is a schematic block diagram of an exemplary embodiment of the Touch Assisted Command and Control system. Referring now to FIG. 2, system 100 can create common operating picture 32 that can be understood by culturally disparate public and private agencies and organizations to train decision makers by allowing them to view results of their actions in a simulated environment, and to manage unexpected events in a command and control environment. System 100 can provide the ability to display asset location information 43, aggregate asset data 15 obtained from multiple sources and display/visualize these aggregated data, identify asset dependencies 73 and vulnerabilities 75, and utilize analytical tools 77 to perform disruption impact analyses. System 100 can be used to develop and test policies and procedures to respond to unexpected events 23 such as, for example, terrorist events and natural disasters, and can train decision makers by allowing them (1) to view results 83 of their actions in a simulated environment, and (2) to manage unexpected events 23 in a command and control environment.

Continuing to refer to FIG. 12, system 100 can include, but is not limited to including, identification process 11 configured to identify, classify or typify, locate, and understand what is Critical Infrastructure/Key Resources (CI/KR) known herein also as key assets and what is not. Identification process 11 can include, but is not limited to determining the vulnerabilities and dependencies of selected CI/KR assets, and selecting the best source of imagery to utilize as a base canvas for visualizing event scenarios. Identification process 11 can include imagery processor 88 which can optimally incorporate images ranging from simple charts or diagrams to complex images from sources such as, for example, Geographic Information System (GIS) databases, data management tools, for example, ESRI® ARCGIS®, streaming feeds, for example, DIGITAL-GLOBE™, and other complex data sources, and can provide structure to the complexity of CI/KR and its classification or organization into asset types 37A. System 100 can also include automated data aggregation system (ADAS) 69 configured to determine who owns a critical infrastructure or asset 53 and how to contact the owner of asset 53. ADAS 69 can also be configured to collect geospatial, public, internet, internal, private, and official raw data.

Continuing to still further refer to FIG. 12, system 100 incorporates analytical tools 77 including the, which can be configured to identify the effects that result from interdependencies between infrastructure components. Interdependencies can include physical/direct linkages, indirect (geospatial) linkages, policy/procedural dependencies, informational dependencies, societal dependencies, and supply chain dependencies.

Continuing to still further refer to FIG. 12, system 100 can also include data visualization engine (DVE) 37 configured to integrate received data into one visual network and serve as common operating picture 32 for command and control. DVE 37 can be configured to illustrate the consequences based on a behavior attribute. DVE can be configured to acquire two dimensional and/or three dimensional imagery of an area of interest, thereby creating an easily understood functional canvas which can be subsequently used to present asset data and the results of analyses. Data resolution requirements can vary depending on the nature of the analysis. Imagery types can include charts, diagrams, three dimensional structures, topographical mapping, orthophoto production, planimetric mapping, digital elevation models, and terrain modeling.

Continuing to still further refer to FIG. 12, system 100 can also include asset information management system (AIMS) 45 configured to provide structure, an asset catalog, security, fast access, and flexible and expandable storage. AIMS intelligently manages CI/KR information, asset details, and vulnerabilities and dependencies and their effect on the performance of an asset 53, such as, for example, required inputs, outputs produced, sustainability, sensitivities, consequences of failure, and recovery limitations. Based on this analysis, other assets that impact the function of the critical assets can be identified and added to asset information database 49. For example, input for a diesel generator might include diesel fuel lubricating oil, cooling water, Supervisory Control and Data Acquisition (SCADA) for automatic startup, and human activity for manual startup; output might include exhaust and electricity; and vulnerabilities might include high water level due to flooding and vibration damage due to a seismic event.

Continuing to still further refer to FIG. 12, identification process (IDENT) 11 can be utilized to, for example, (1) identify region 19 of interest and at least one disaster or disruptive event 23, (2) obtain imagery 27 to prepare base canvas 27A and three dimensional data 29A associated with region 19 of interest, (3) identify a plurality of assets 53 required to respond to the at least one disaster or disruptive event 23, and (4) identify asset dependencies 73 and asset vulnerabilities 75. DVE 37 can be configured to, for example, (1) prepare base canvas 27A and the three dimensional data 29A associated with region 19 of interest, (2) superimpose asset data 15 in a manner that it appears to the user, for example by user interface 21, as data layer 31 for each of the asset types 37A, (3) superimpose graphical representations 33 associated with assets 53, (4) create region display 34 including base canvas 27A, the plurality of data layers 31, data feeds 13, graphical representations 33, and control interface tools 94, (5) display region display 34, (6) geospatially align the plurality of data layers 31 and data feeds 13 with base canvas 27A according to location information 43, (7) enable manipulation of region display 34 in order to view selected areas, display assets 53 and associated graphical representations 33 in the selected areas, (8) provide asset dependencies 73, asset vulnerabilities 75, disaster or disruptive event assets 53, sensor data 18, and current asset condition 39B, to analytical tools 77 through asset information feed 65, (9) receive results 83 from analytical tools 77, (10) determine current asset condition 39B based on results 83, and (11) retrieve, aggregate and display asset data 15 from displayed assets 63 using display processor 59.

Continuing to still further refer to FIG. 12, AIMS 45 can be configured to, for example, (1) manage, by, for example, database manager 47, the retrieval and/or storage of asset information 49, and information stored in external databases, (2) store asset data 15, and updated assets 55, (3) store asset information 49, which may include asset data 15, asset location information 43, asset dependencies 73, and asset vulnerabilities 75, (4) receive query 67A of displayed assets 63, (5) retrieve, by, for example, query processor 67, asset information 49 associated with displayed assets 63 based on query 67A, (6) receive results 83 from analytic tools 77, and (7) update asset data 15 forming updated assets 55 based on results 83. ADAS 69 can be configured to, for example, (1) obtain updated assets 55 from asset data updater 71 by comparing query results from query 67A to asset information 49, and (2) obtain information about assets 53 within region 19. AIMS 45 and DVE 37 can be configured to train personnel, test policies and procedures associated with disaster or disruptive event 23, and provide common operating picture 32 for command and control of disaster or disruptive event 23 by using sensor data 18 from sensors 91, simulated input 22, or manually changed conditions 39A to determine current asset condition 39B associated with disaster or disruptive event 23, by feeding displayed assets 63, asset dependencies 73, and asset vulnerabilities 75 to analytical tools 77, and by replacing asset data 15 with updated assets 55 and repeating these steps as disaster or disruptive event 23 evolves, providing results 83 that can be shared, for example, by communications network 79, among multiple displays and used to coordinate and control a response to disaster or disruptive event 23, including deploying and tracking assets based on location information 43 received from location receiver 92.

Continuing to still further refer to FIG. 12, an example of the use of system 100 is an urban setting in which the availability of care during and after flooding in proximity to a hospital is of concern. Factors that could influence the availability of care can include availability of electric power, ability to sustain operation after loss of power, and access to the hospital. After system 100 is executed, during an after action review, it could be found that the simulation indicates that current system architectures do not take into account the consequences of power supply interdependencies. System 100 can be used to identify architecture redesign aspects such as, for example, having portable standby dewatering pumps that could be brought to bear, having an alternative source of power to the pump, hardening the substation to prevent water ingress, increasing fuel storage at the hospital, having a means of fuel delivery that does not require the use of the main access routes, having a second source of power to the hospital, and carrying fuel to the hospital on boats. After the cost/benefit analysis of possible remedial actions is complete, system 100 can be provided with the information as modified by the result of the cost/benefit analysis, and can be used to simulate the flooding event again.

Figure 13A:
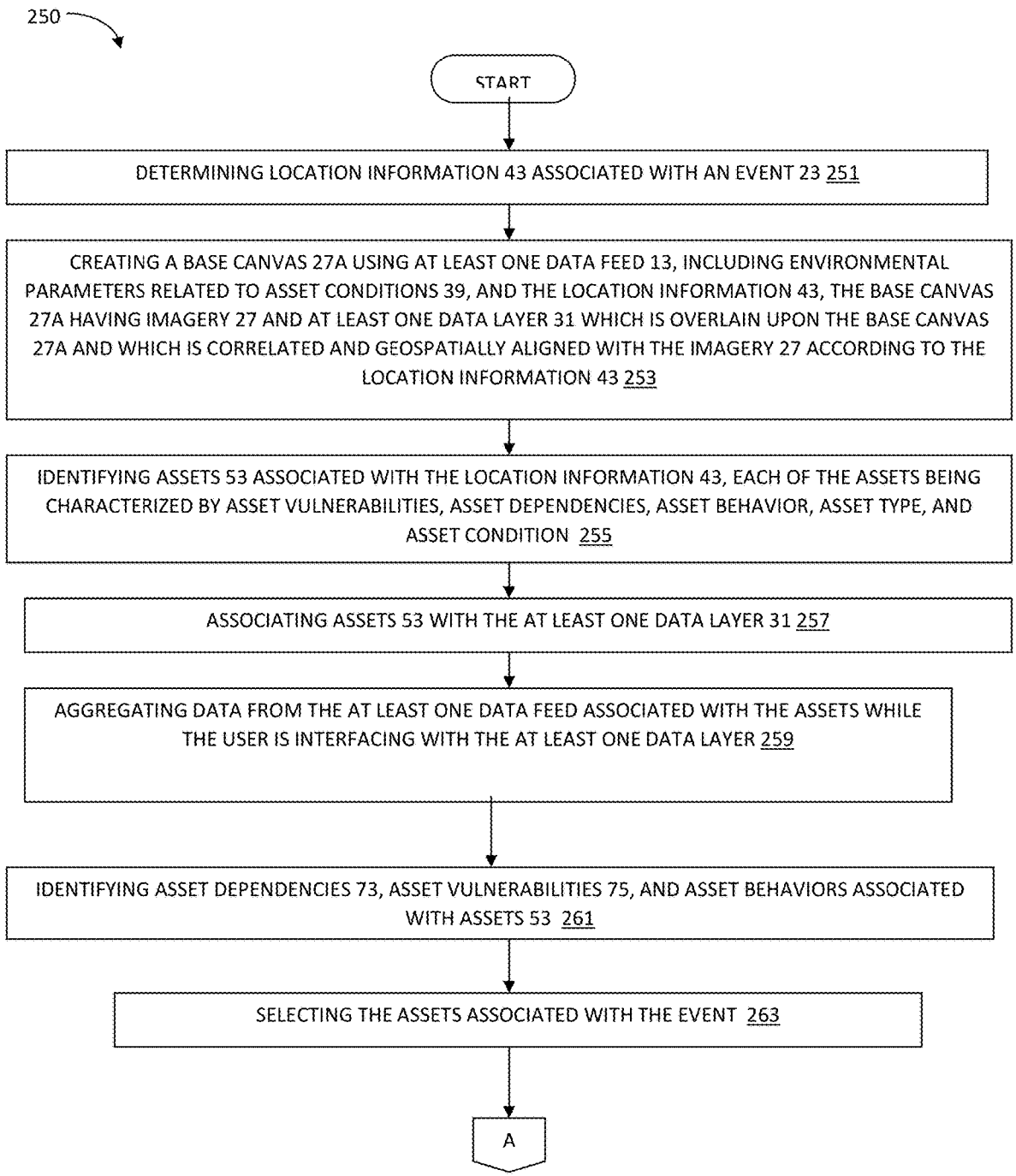
FIGS. 13A-13B are flowcharts of the method of the event simulation using the exemplary embodiment of these teachings.
Figure 13B:
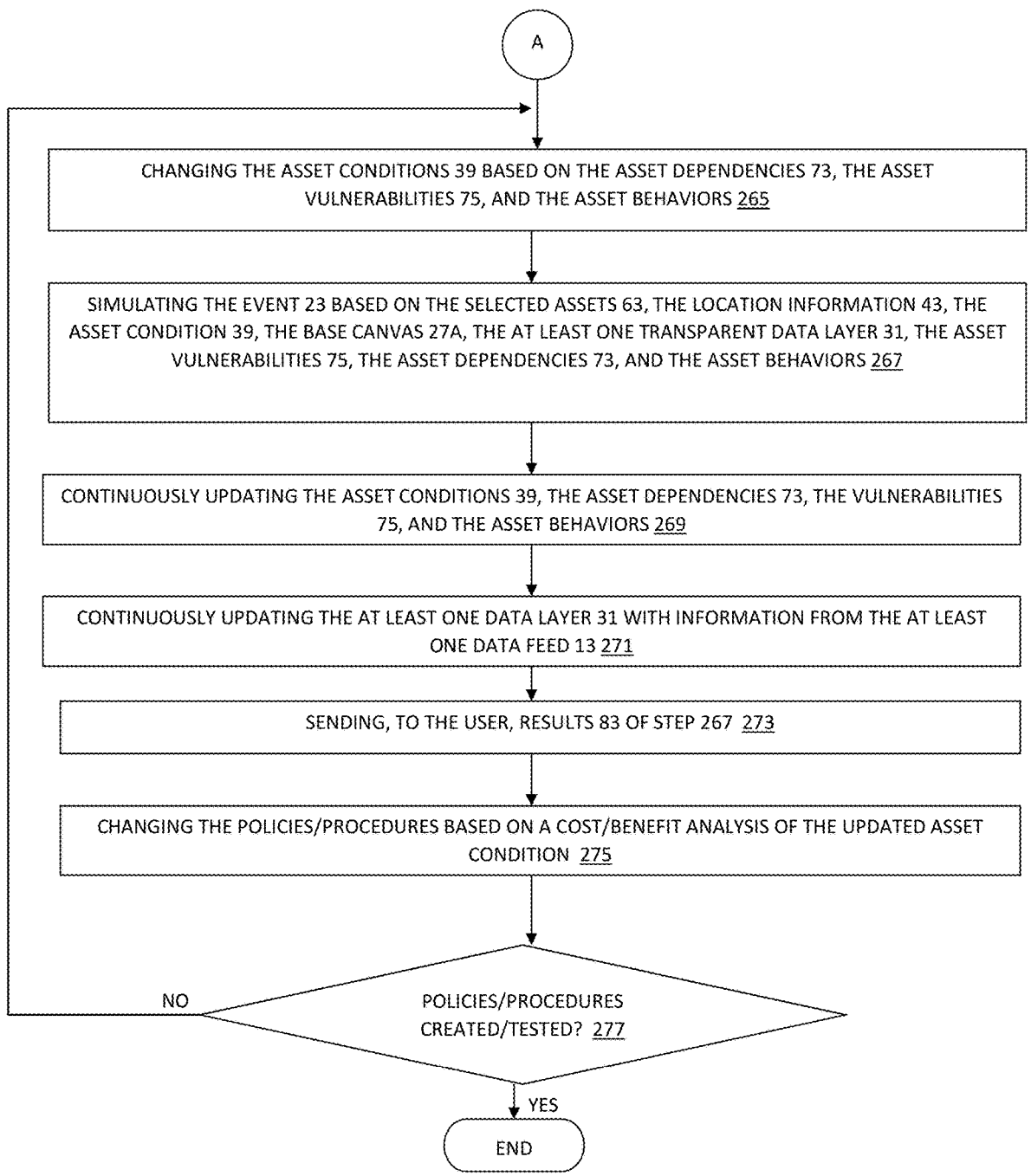

FIGS. 13A-13B are flowcharts of the method of the simulation using the Touch Assisted Command and Control system. Referring primarily to FIGS. 13A-13B, method 250 for creating and testing procedures/policies to respond to an event 23 can include, but is not limited to including, the steps of (a) determining 251 location information 43 associated with event 23, and (b) creating 253 base canvas 27A using at least one data feed 13, which can include, but is not limited to including, environmental parameters related to asset conditions such as, for example, ambient temperature, and location information 43. Base canvas 27A can include imagery 27 and at least one data layer 31 which can be overlain upon base canvas 27A and which can be correlated and geospatially aligned with imagery 27 according to location information 43. Method 250 can also include the steps of (c) identifying 255 assets 53 associated with location information 43, each of the assets being characterized by asset vulnerabilities, asset dependencies, asset behavior, asset type, and asset condition, (d) associating 257 assets 53 with at least one data layer 31, (e) aggregating 259 data from at least one data feed 13 associated with assets 53 while the user is interfacing with at least one data layer 31, and (f) identifying 261 asset dependencies 73, asset vulnerabilities 75, and asset behaviors associated with assets 53. Method 250 can also include the steps of (g) selecting 263 assets 53 associated with event 23, (h) changing 265 asset condition 39 based on asset dependencies 73, asset vulnerabilities 75, and asset behaviors, and (i) simulating 267 event 23 based on selected assets 54, location information 43, asset condition 39, base canvas 27A, at least one data layer 31, asset vulnerabilities 75, asset dependencies 73, and asset behavior. Method 250 can still further include the steps of (j) continuously updating 269 asset condition 39 based on asset vulnerabilities 75, asset dependencies 73, and asset behaviors, (k) continuously updating 271 at least one data layer 31 with information from the at least one data feed 13, (l) sending 273 results 83 of the step of simulating to the user, (m) changing 275 the policies/procedures based on a cost/benefit analysis of the updated asset condition, and repeating 277 steps (h)-(m) until the policies and procedures are created and tested.

Method 250 can optionally include the steps of recording asset dependencies 73 and asset vulnerabilities 75 on computer-readable medium 26, grouping assets 53 according to asset type 37A, automatically deriving type-specific data from assets 53 based on asset type 37A, and storing the asset-specific or type-specific data on computer-readable medium 26. Method 250 can also optionally include the step of applying visualization and control interface tools 94 so that assets 53 appear to the user to be operating in the at least one data layer 31. Method 250 can still further optionally include the steps of identifying an alternate group of data feeds from data feeds 13, identifying and resolving conflicts among information received from data feeds 13 and the alternate group using predetermined algorithms, identifying specific data feeds from data feeds 13 that contain analytical information, and superimposing the analytical information on at least one data layer 31.

Figure 14A:
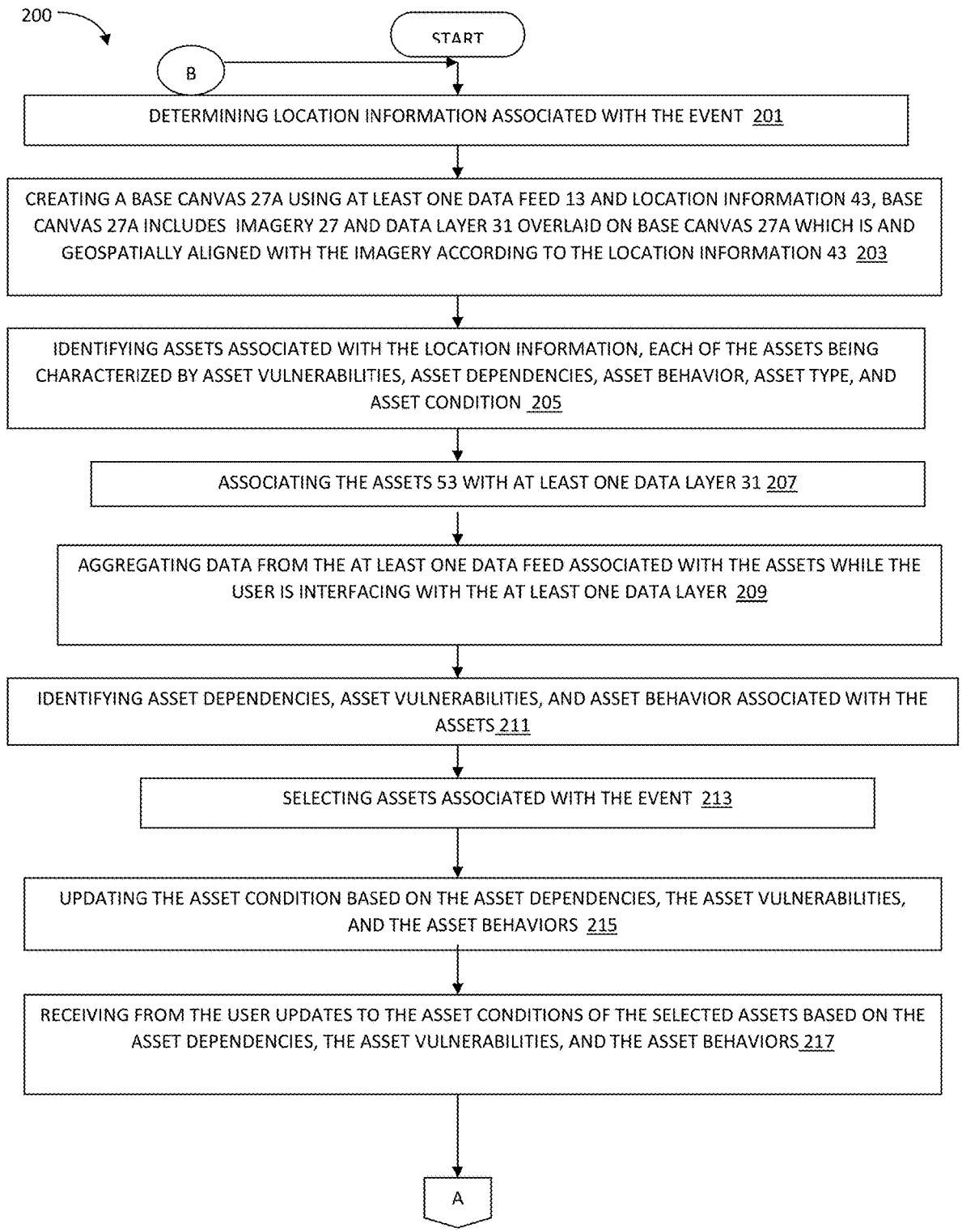
FIGS. 14A-14B are flowcharts of an illustrative method of use of the event system, used in one exemplary embodiment, as used for training and policy development.
Figure 14B:
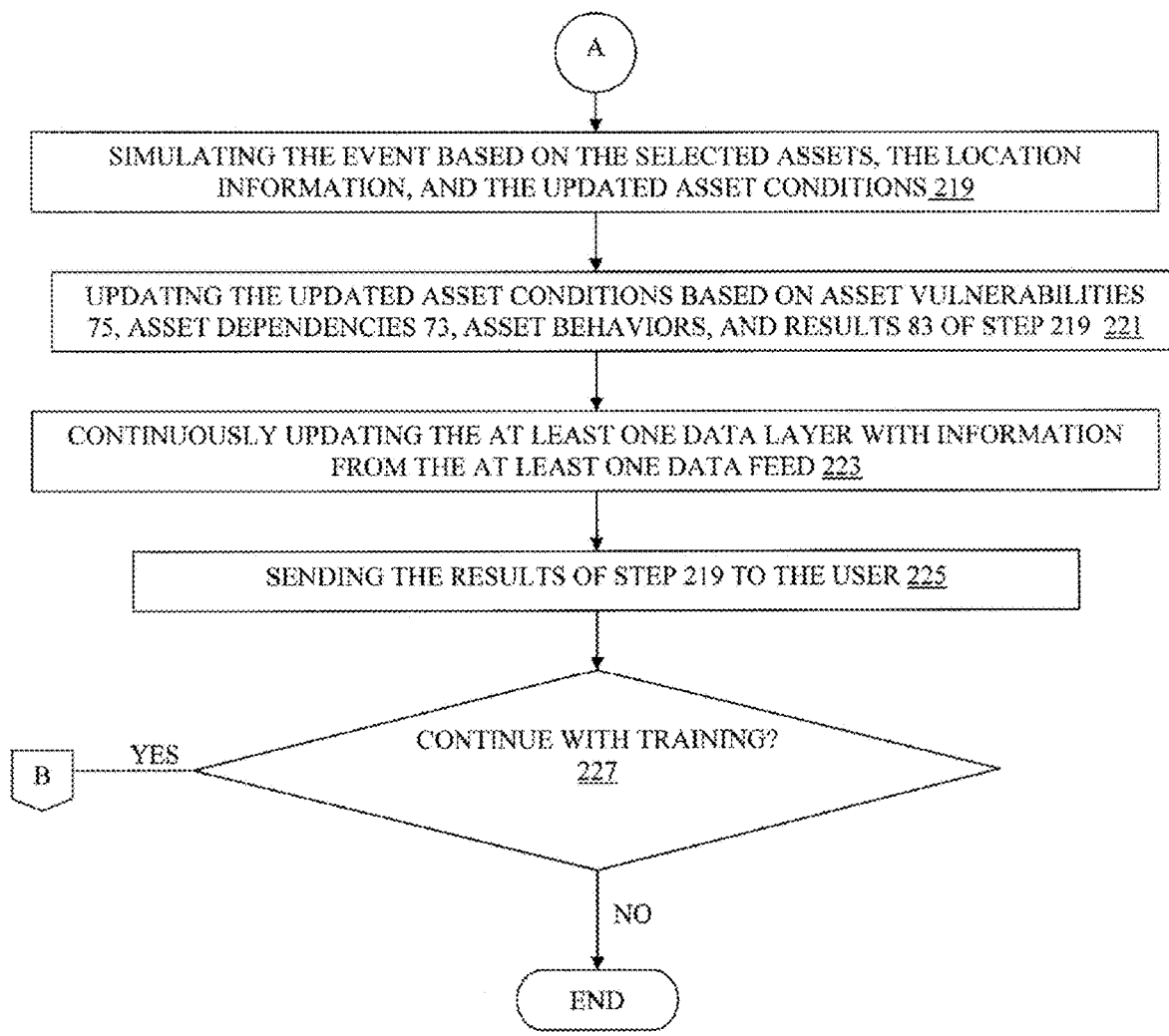
Figure 15:
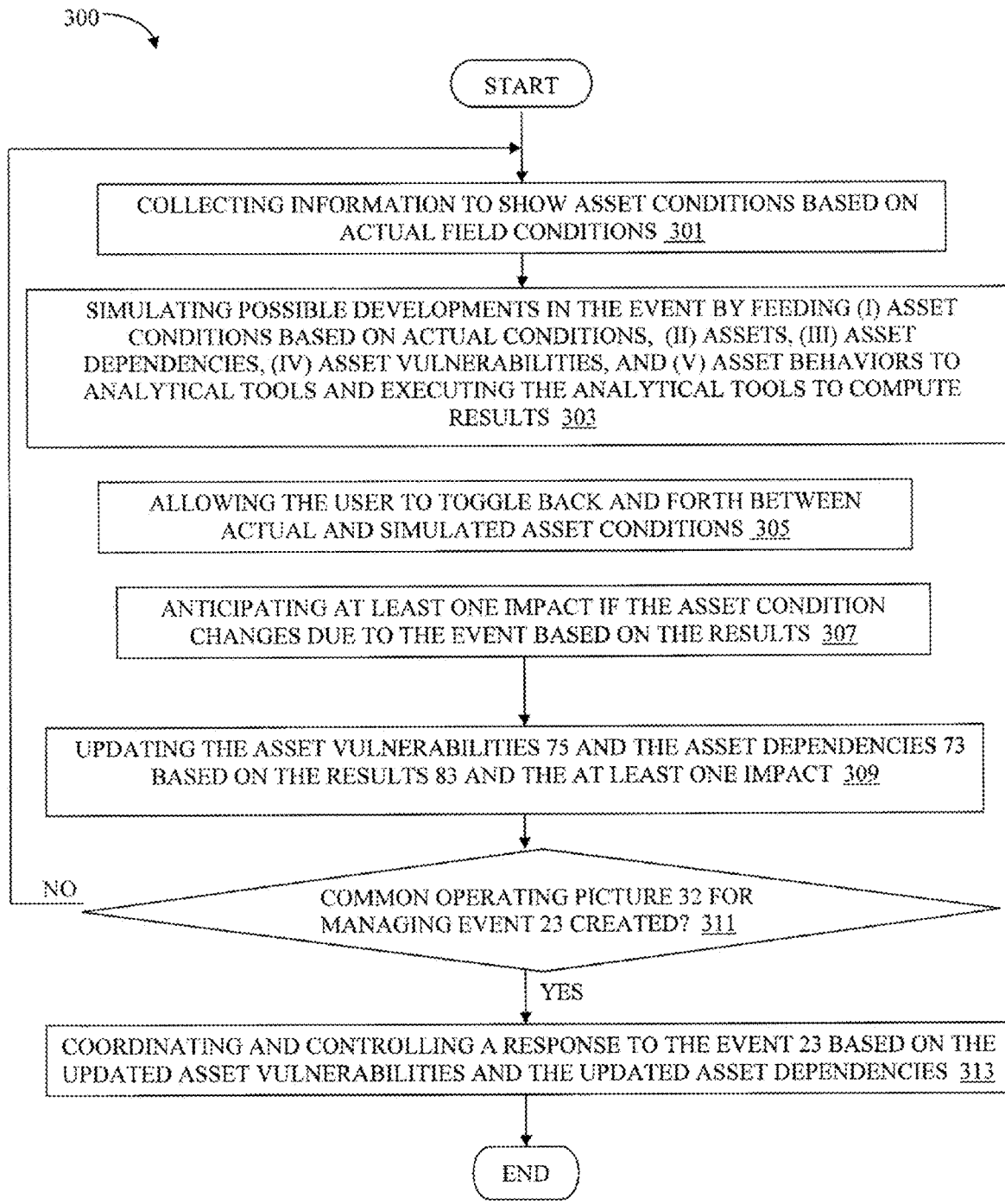
FIG. 15 is a flowchart of the use of the event system used in one exemplary embodiment of these teachings.

FIGS. 14A-14B are flowcharts of an illustrative method of use of the Touch Assisted Command and Control system. Referring now primarily to FIGS. 14A-14B, method 200 for training personnel to respond to an event 23 can include, but is not limited to including, the steps of (a) determining 201 location information 43 associated with event 23, and (b) creating 203 base canvas 27A using at least one data feed 13 and location information 43. Base canvas 27A can include imagery 27 and at least one data layer 31 overlain upon base canvas 27A which is correlated and geospatially aligned with imagery 27 according to location information 43, (c) identifying 205 assets 53 associated with location information 43, each asset 53 being characterized by asset vulnerabilities 75, asset dependencies 73, asset behavior, asset type 37A, and asset condition 39, (d) associating 207 assets 53 with at least one data layer 31, and (e) aggregating 209 data from at least one data feed 13 associated with the assets 53 while the user is interfacing with at least one data layer 31. Method 200 can also include the steps of (f) identifying 211 asset dependencies 73, asset vulnerabilities 75, and asset behavior associated with assets 53, (g) selecting 213 assets 53 associated with event 23, (h) updating 215 asset condition 39 based on asset dependencies 73, asset vulnerabilities 75, and asset behaviors, (i) receiving 217 from the user updates to asset conditions 39 of selected assets 54 based on asset dependencies 73, asset vulnerabilities 75, and asset behaviors. Method 200 can further include the steps of (j) simulating 219 event 23 based on selected assets 54, location information 43, the updated asset conditions, (k) updating 221 the updated asset conditions based on asset vulnerabilities 75, asset dependencies 73, asset behaviors, and results 83 of step (j), (l) continuously updating 223 at least one data layer 31 with information from at least one data feed 13, (m) sending 225 results 83 of step (j) to the user, and (n) repeating 227 steps (i)-(m) until the training is complete. Method 200 can optionally include the step of feeding asset condition 39, asset dependencies 73, asset vulnerabilities 75, and asset behaviors to analytical tools 77 to create the modified asset conditions.

In an alternate embodiment, an alternate method for aggregating and displaying asset information to create a common operating picture 32 that can be utilized to simulate an event 23 to train personnel and develop and test policies and procedures can include, but is not limited to, the steps of (a) preparing base canvas 27A from imagery 27 and data 29A associated with region 19 of interest associated with event 23, (b) identifying assets 53 required to respond to event 23, (c) identifying asset data 15 related to assets 53; (d) supplementing asset data by conducting automated queries against data feeds 13, (e) receiving location information 43 for assets 53, and (f) correlating and geospatially aligning data layers 31 and data from data feeds 13 with base canvas 27A according to location information 43. The alternate method can also include the steps of (g) providing correlated/aligned data 16, data layers 31, and base canvas 27A to the user, and (h) aggregating correlated/aligned data 16 into region display 34 including base canvas 27A, data layers 31, data from data feeds 13, and graphical representations 33 associated with selected assets 54 from assets 53. The alternate method can still further include the steps of (i) querying selected assets 54 to retrieve supplemented asset data associated with selected assets 54, (j) identifying, from supplemented asset data, asset dependencies 73, asset vulnerabilities 75, and asset behaviors of selected assets 54, and (k) creating common operating picture 32 based on base canvas 27A, data layers 31, data from data feeds 13, asset dependencies 73, asset vulnerabilities 75, and asset behaviors.

The alternate method can optionally include the steps of (l) identifying the region 19 of interest and event 23, (m) receiving and processing imagery 27 associated with region 19, (n) grouping assets 53 according to asset type 37A, (o) displaying each of asset type 37A as one data layer 31, (p) configuring location information 43 of one or more of graphical representations 33 so that location information 43 appears to be located on data layer 31, (q) displaying region display 34, (r) enabling manipulation of region display 34 in order to view selected areas within region display 34, (s) displaying selected assets 54 associated with graphical representations 33 in the selected areas, (t) aggregating and displaying asset data 15 from selected assets 54, and (u) creating common operating picture 32 based on steps (l)-(t).

It should be noted that, in the Touch Assisted Command and Control System (TACCS™), the number of critical infrastructure resources and the other critical infrastructure resources are identified without using critical decision points (CDPs), CDPs being identified moments where a decision has greater potential to affect an outcome.

In the exemplary embodiment, which is implemented by a computer or a network of computers using the Touch Assisted Command and Control System (TACCS™) (see patent application Ser. No. 12/208,738 and also as disclosed above), the system and method of these teachings uses relevant information contained in one or more appropriate databases and using relevant geospatial information (location information, effectively longitude and latitude). The system and method of these teachings are generally described below, but may be varied slightly to enable them to be more efficiently accomplished based on available technology or programming practices.

The exemplary embodiment includes the following steps:

1. Identify the CI/KR that are involved in the on-going operations of a community or an organization and that are essential to the welfare of the community or the organization such that, if the operation of such CI/KR were to become wholly or partially impaired, the welfare of the community or the organization would be adversely affected.

2. Identify for each CI/KR the inputs that are necessary for its continued operation. FIG. 2 illustrates a logic diagram showing the inputs necessary for the continued operation of the illustrative CI/KR, in this instance a distribution center; and the logic by which the condition of the distribution center results from the lack of one or more of the inputs necessary for its operation.

3. In the exemplary embodiment, using a computer and the software program TACCS™, create a network for each CI/KR, wherein each CI/KR is connected to other assets upon which its continued operation depends. The dependencies of any CI/KR may be the result of physical, procedural, or social relationships. In the exemplary embodiment, using a computer and the software program TACCS™, when such networks are completed for all CI/KR, integrate networks of dependencies and interdependencies across all CI/KR.

Figure 4:
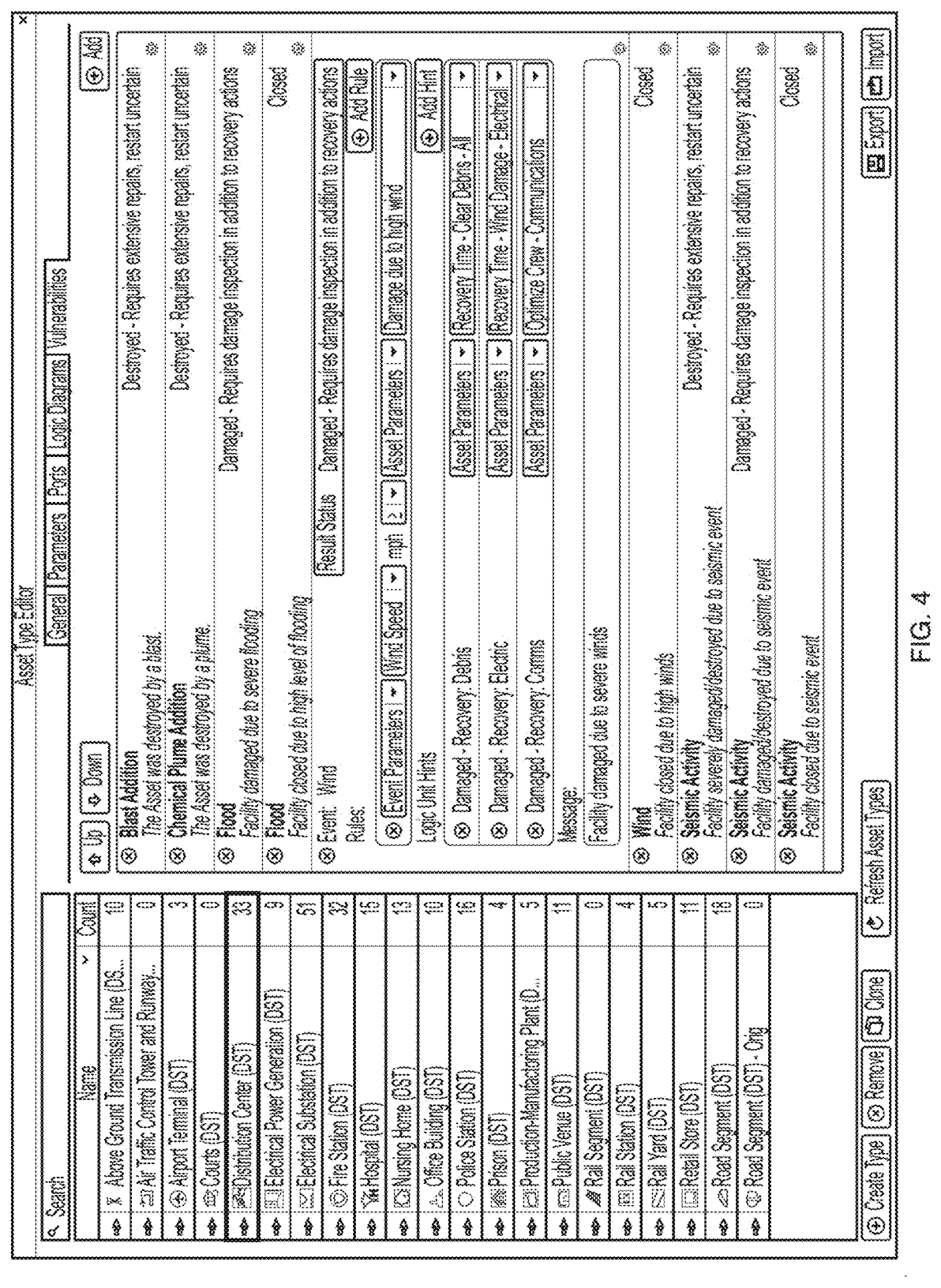
Figure 4A:
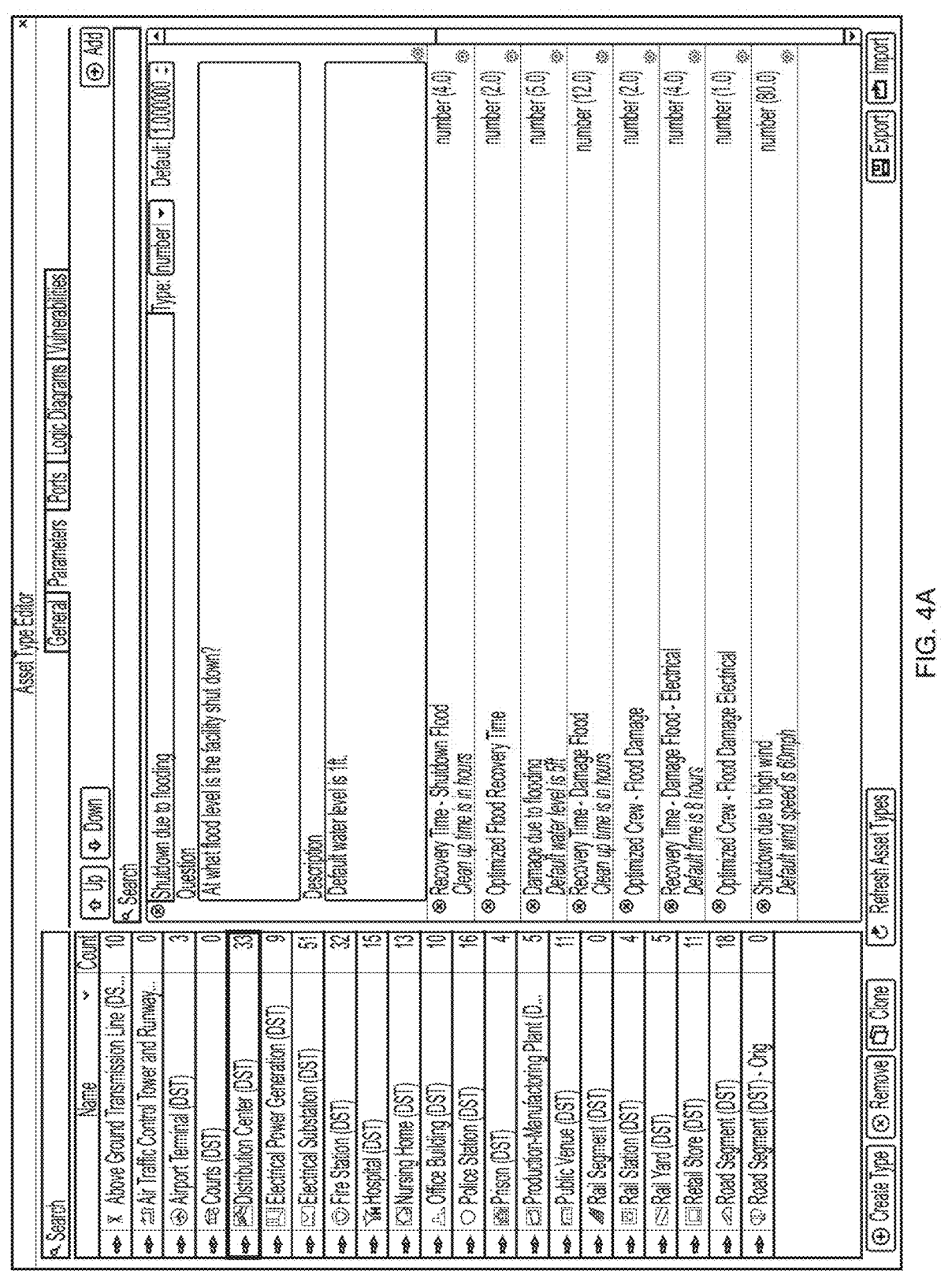
Figure 4B:
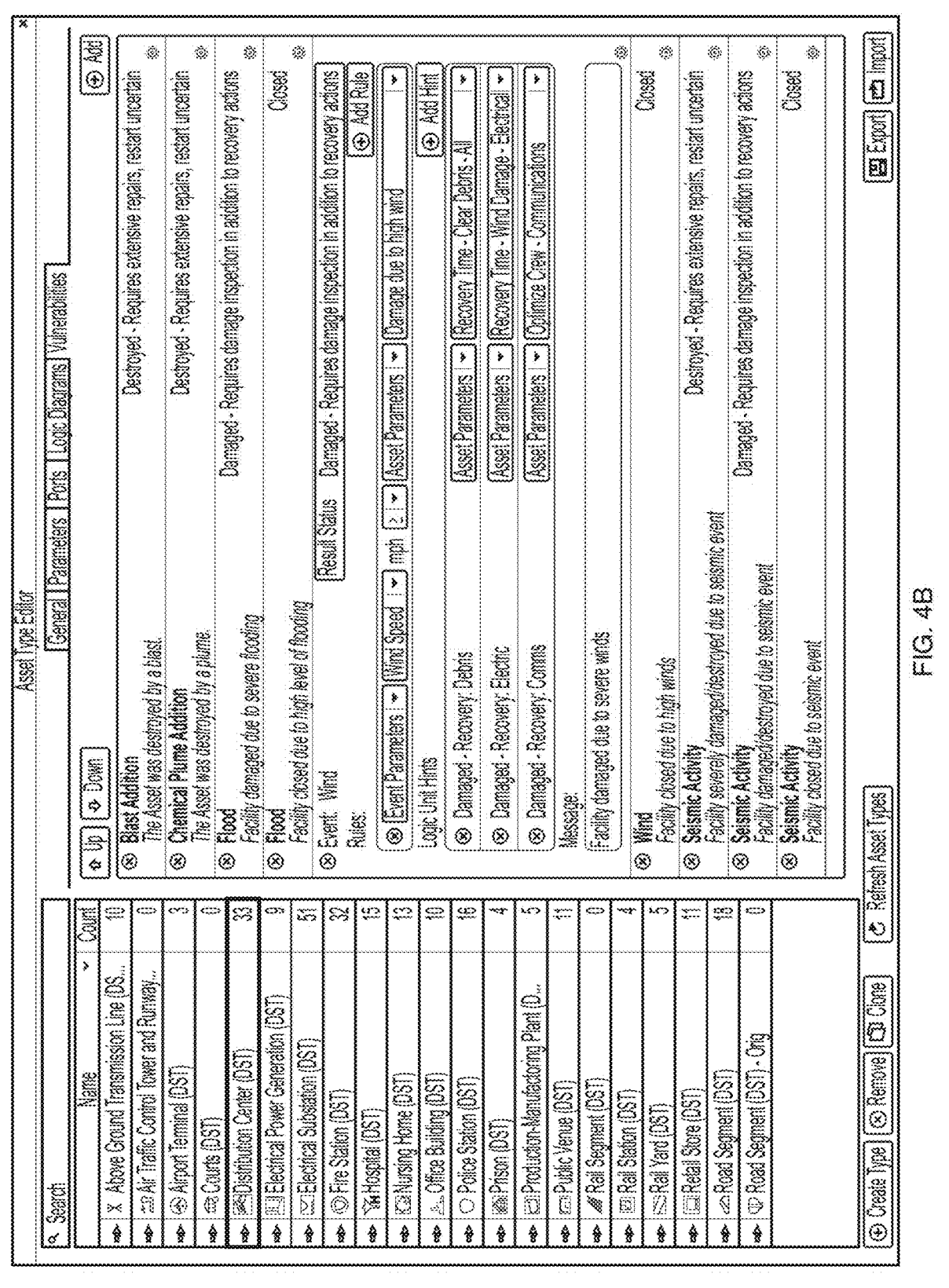

4. In the exemplary embodiment, using a computer and the software program TACCS™, identify for each CI/KR the environmental conditions (which may be natural conditions such as wind or flooding or other conditions, including those that may be the result of human activity, accidental or intended) that would cause the operations of the CI/KR to become wholly or partially impaired (for example, one CI/KR may become inoperable if its location is flooded to a depth of 6 feet, another if it suffers winds in excess of 80 mph, yet another if it is within the blast zone of an explosive device having specific characteristics or if it is contaminated by radioactive fallout, and so on). FIG. 4 illustrates various conditions to which the CI/KR may be subject that would result in the operability of the CI/KR being adversely affected. The detail for the "wind" event, with various drop down elements, is also shown. FIG. 4(a) illustrates the manner in which, among other things, the parameter is set that would cause the CI/KR to be damaged; in FIG. 4(a) the wind speed parameter is set at 100 mph.

Figure 5:
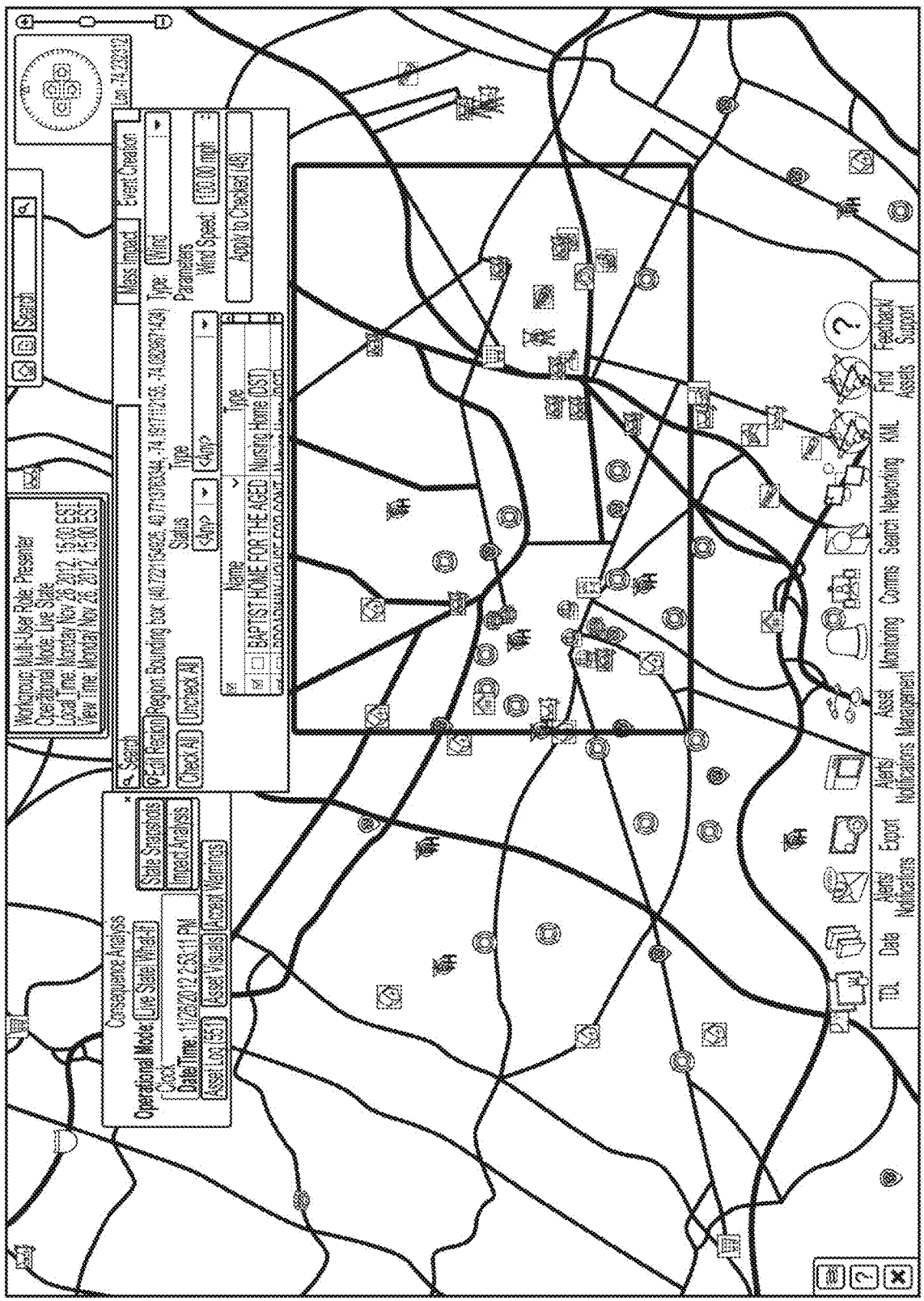
FIG. 5 shows the effects of the imposition of a specific condition over an area that contains assets in a network of assets, the assets including critical infrastructure resources.

5. In the exemplary embodiment, using a computer and the software program TACCS™, impose one or more selected environmental conditions over a geographic area containing CI/KR or containing a part of a network involving CI/KR. In the exemplary embodiment, the operation of the software TACCS™ will automatically cause the CI/KR networks created in TACCS™ to display the effects of the imposed environmental conditions on the operations of CI/KR, both in the CI/KR directly affected by the imposed environmental conditions if such conditions are within the disabling conditions established for the individual CI/KR, and also in the CI/KR that may not be directly affected by the imposed environmental conditions but are dependent, through the linkages reflected in the dependency networks, upon those CI/KR that are directly disabled by the imposed environmental conditions. In such exemplary embodiment, the software may provide a variety of analyses, including reports that profile the upstream and downstream interdependencies of a specified CI/KR, identifying not only the damage to a particular CI/KR, but also damage to upstream assets that must be restored to operability to enable the CI/KR to function. FIG. 5 shows the imposition of a selected environmental condition (a wind speed of 100 mph) over an illustrative area (defined by the shaded rectangle) as a consequence of which the operation of various CI/KR located outside of the directly affected area is impaired by virtue of their being dependent upon CI/KR that are located within the directly affected area and that have been impaired by reason of the selected environmental condition (impaired CI/KR are identified by circles and arrows; selected unimpaired CI/KR are identified by arrows).

Figure 6:
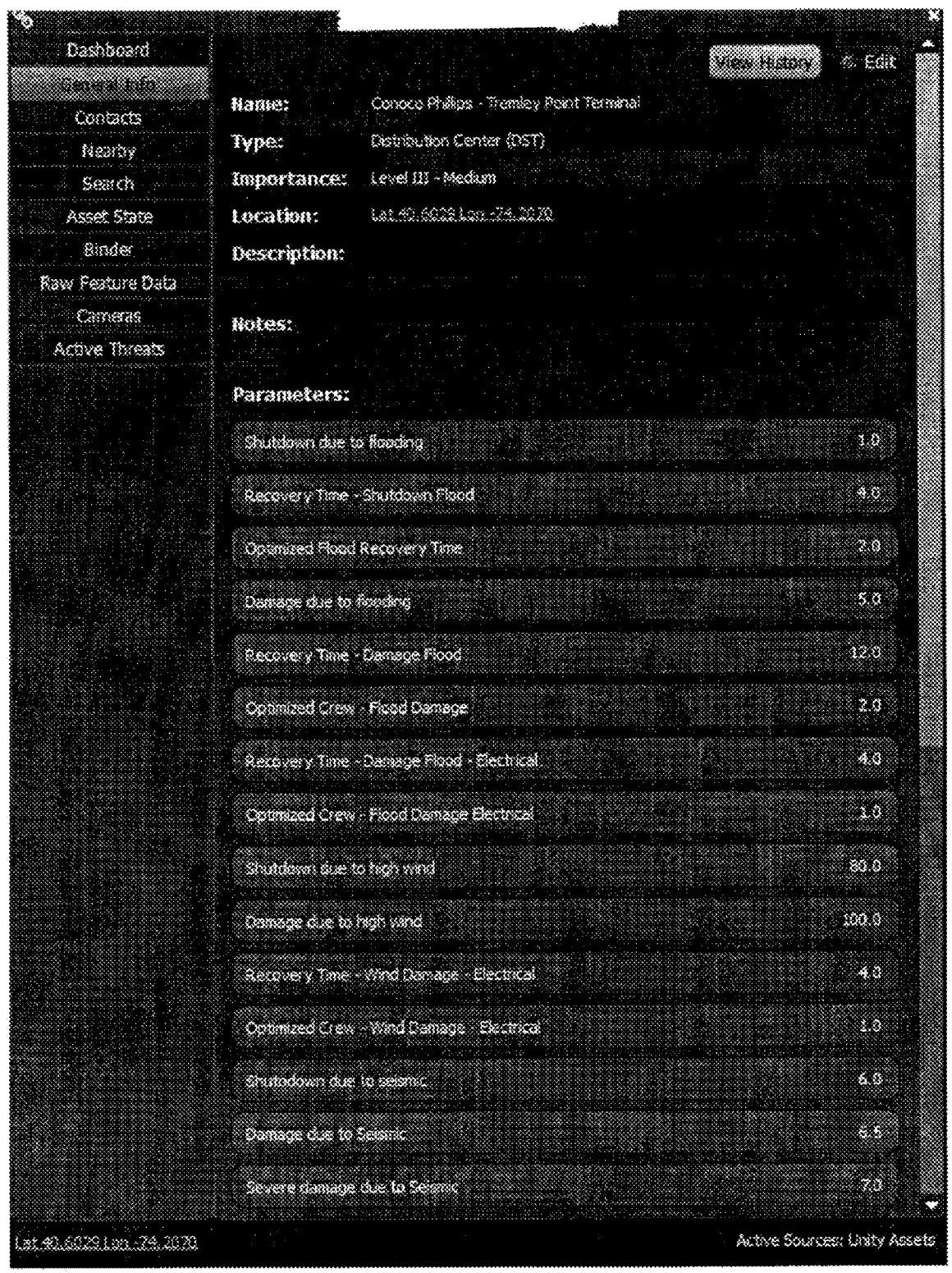
FIG. 6 illustrates parameters for one critical infrastructure resource, the parameters including recovery time for various events.
Figure 6A:
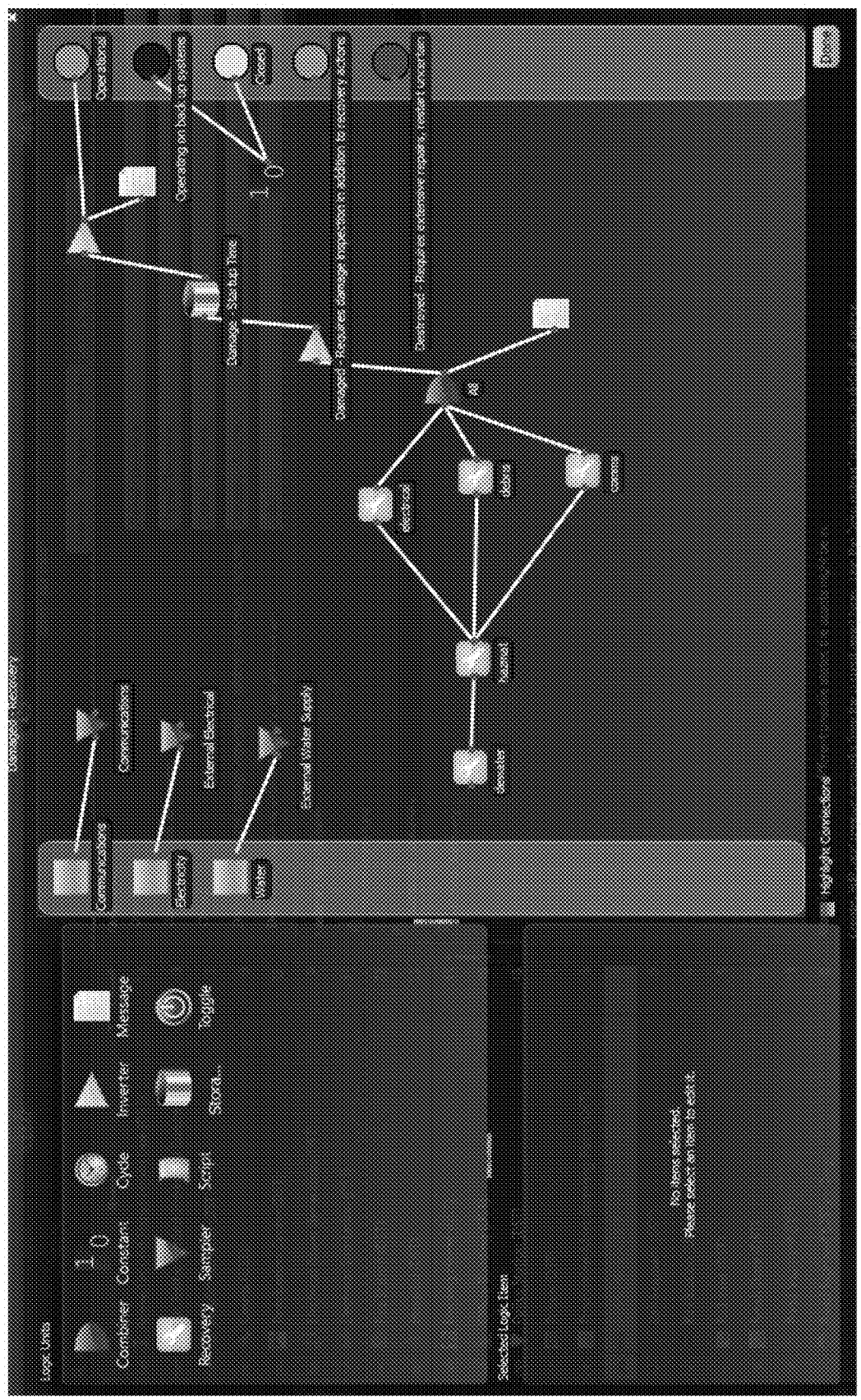
FIG. 6a illustrates a logic diagram for recovery operations for one critical infrastructure resource.

6. Identify for each disabled CI/KR the actions that must be taken to restore such CI/KR to operational state, the Recovery Assets that must be used to implement such actions (different Recovery Assets may be created to perform different types of recovery actions, using the degree of specificity deemed appropriate), and the time it will take using such Recovery Assets to restore such CI/KR to operation. Both parallel and serial recovery operations can be performed according to what is suitable for the CI/KR in question (for example, electricity may be restored by an electrical crew and water supplies may be restored by a plumbing crew, and such activities could be accomplished during the same period or in successive periods, depending upon the circumstances of the occurrence, the availability of Recovery Assets and the condition of the CI/KR). In the exemplary embodiment, using a computer and the software program TACCS™, each Recovery Asset shall be characterized by inputs, outputs and conditions in the same manner as CI/KR, and each CI/KR shall be characterized by the time, the Recovery Assets and the order of work to be performed by the Recovery Assets involved to return such CI/KR to operability in the event of an impairment caused by a specified environmental condition (for instance, if a generator were flooded out, it may take two electrical crews and one clean-up crew four days to pull out the generator, rehab the space and install a replacement, with the clean-up crew having to do four hours of dewatering before any work could start by an electrical crew; whereas, were the line leading to the generator to be short-circuited, the generator might be restored by one electrical crew in four hours). FIG. 6 illustrates recovery times needed to restore the illustrative CI/KR to functionality under certain conditions. FIG. 6(*a*) shows a logic diagram identifying the steps that must be taken to restore a CI/KR to operational status, and the order in which such steps are to be taken.

7. Identify any emergency equipment that may be deployed by a third party in the course of the recovery (e.g., emergency generators, temporary shelters), and determine the effects upon any CI/KR that would result from the deployment of such emergency equipment.

Figure 8:
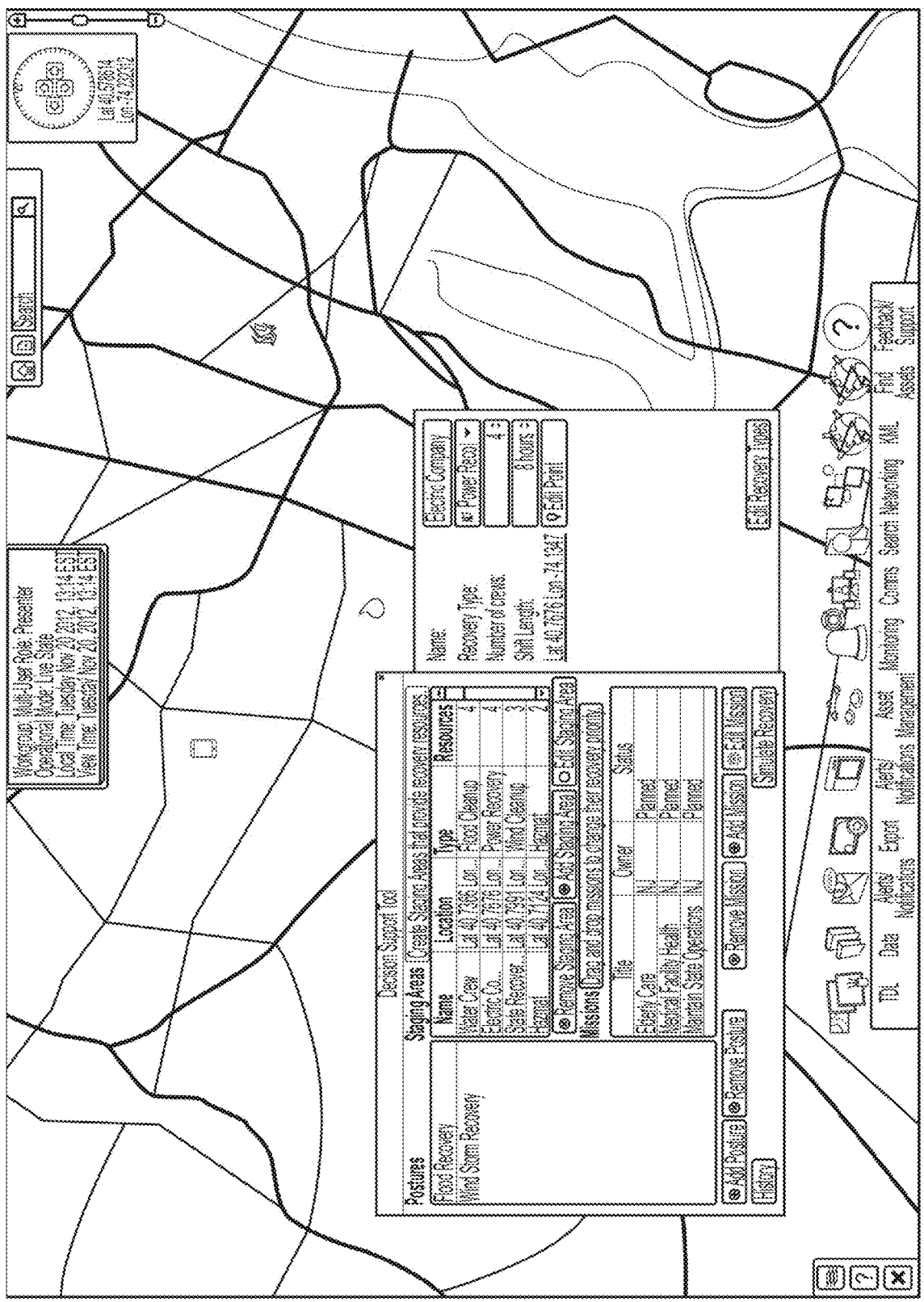
FIG. 8 shows a staging area that has been identified (within the circle marked by the arrow), and the Recovery Assets that are available at that staging area, for one exemplary embodiment of the method of these teachings.

8. In the exemplary embodiment, using a computer and the software program TACCS™, designate one or more locations of staging areas at which Recovery Assets are to be prepositioned, and designate or identify the Recovery Assets to be placed at each such location. Recovery Assets being prepositioned in staging areas are to be further characterized by defined work shift lengths that represent the availability of personnel. FIG. 8 shows a staging area that has been identified (within the circle marked by the arrow), and the Recovery Assets that are available at that staging area.

Figure 9:
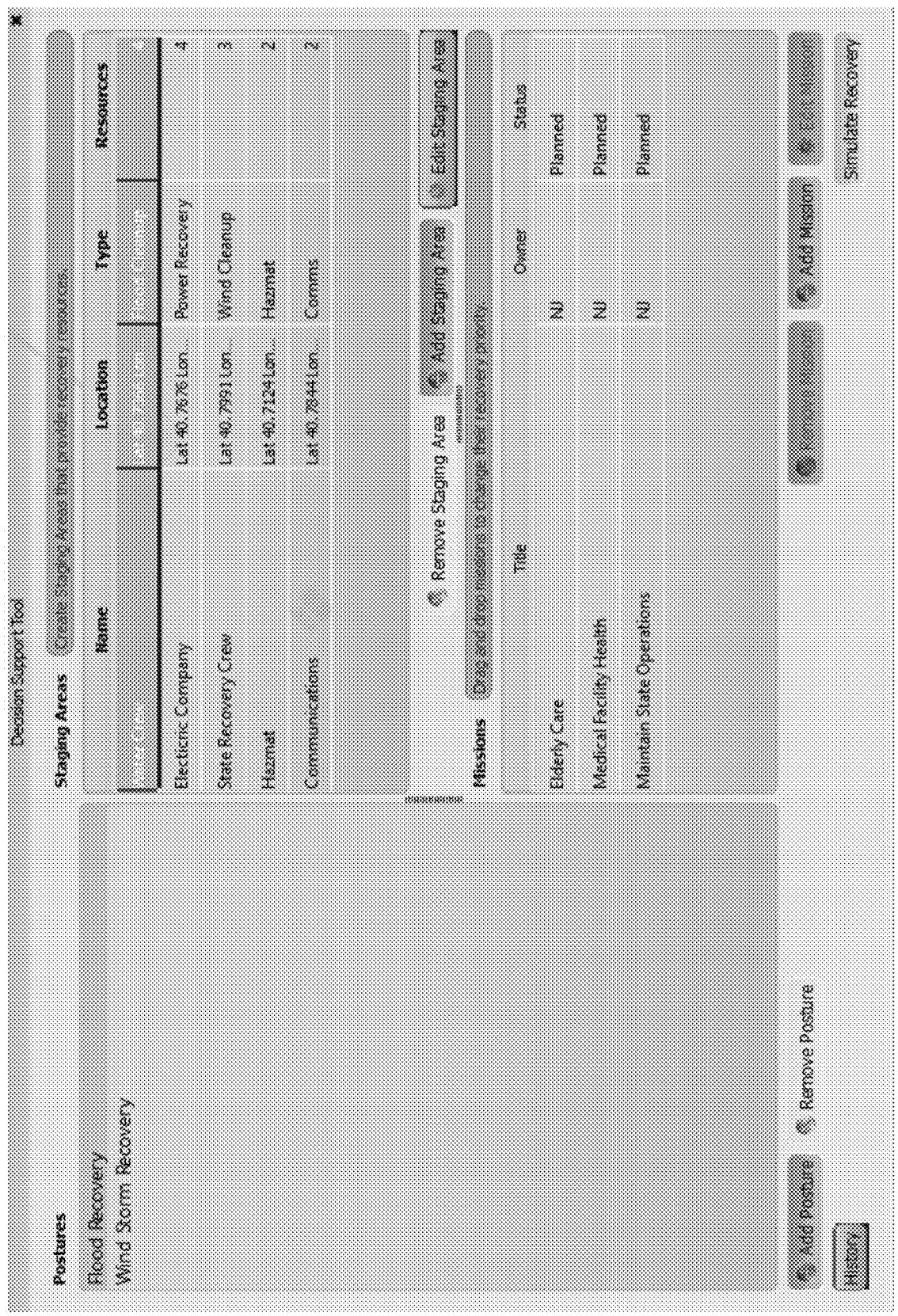
FIG. 9 shows the ordering of various recovery missions based upon a pre-selected priority for recovery, for one exemplary embodiment of the method of these teachings.

9. Using priorities, including, if desired, priorities identified through community-wide or organization-wide analyses, and priorities informed to take into account emergency equipment that may be deployed in the course of the recovery (e.g., emergency generators, temporary shelters), identify the order in which the Recovery Assets are to be deployed among the various impaired CI/KR. In the exemplary embodiment, using a computer and the software program TACCS™, priorities are established either at the CI/KR level or by identifying missions that combine multiple elements of CI/KR along with rules that determine the extent of CI/KR recovery required (e.g., 2 out of 3 fire stations must be returned to operation). In the exemplary embodiment, such priorities are reflected in the software using either or both of two options: "do what I say" and "do what I mean." In the first case, the method of these teachings establishes the order in which disabled CI/KR are to be restored to operation based solely on the availability of Recovery Assets and the relative importance, as specified in advance (using various processes or pursuant to particular instructions or decisions), of the different missions that are dependent upon disabled CI/KR. In such process, the method of these teachings does not incorporate any process by which the overall recovery operation might be optimized. In the second case, the method of these teachings establishes the order in which disabled CI/KR are to be restored to operation based on all of the missions that are affected by the disabled CI/KR, with the restoration of operability of each CI/KR being determined by the importance of such CI/KR to all of the affected missions by its disability and the relative importance of each of those missions. FIG. 9 shows the ordering of various recovery missions based upon a pre-selected priority for recovery, and states how the priorities may be reordered by operation of the software.

10. In the exemplary embodiment, using a computer and the software program TACCS™, simulate the application of the Recovery Assets in accordance with the priorities determined as described above to restore operations to impaired CI/KR. In the exemplary embodiment, using a computer and the software program TACCS™, the time for which Recovery Assets that are to be assigned to a recovery operation for a CI/KR shall include the time involved in departing from the staging area to perform recovery and returning to the staging area when the recovery is complete or when the shift ends. Each Recovery Asset must start its return trip to the staging area with enough time to arrive at the staging area before the end of the current shift. That is, when deciding to dispatch a Recovery Asset to perform a recovery operation for a CI/KR, travel time is taken into account such that the round trip time (from staging area to the CI/KR in need of recovery and back) must be strictly less than the time remaining in the current work shift. If the round trip time is too long, that staging area is deemed ineligible to respond to the specific recovery request for such CI/KR.

11. Further, in the exemplary embodiment, using a computer and the software program TACCS™, simulate the effects of the conditions imposed by the simulation upon the roads that would be used by the Recovery Assets to travel from a staging area to the impaired CI/KR. Because the functionality of roads may be impaired by unintended occurrences, travel of Recovery Assets may be prevented or delayed. The exemplary embodiment uses routing algorithms to analyze street data, which may come from sources such as Open Street Maps for major roads and simple grid representations for smaller roads, to determine optimal routes under existing conditions as imposed by the simulation.

12. In the exemplary embodiment, using a computer and the software program TACCS™, the time to be applied in the software to the recovery operation of a CI/KR shall be the time specified as a characteristic of such CI/KR as the recovery time for the environmental conditions creating the impairment being suffered by such CI/KR.

Figure 10:
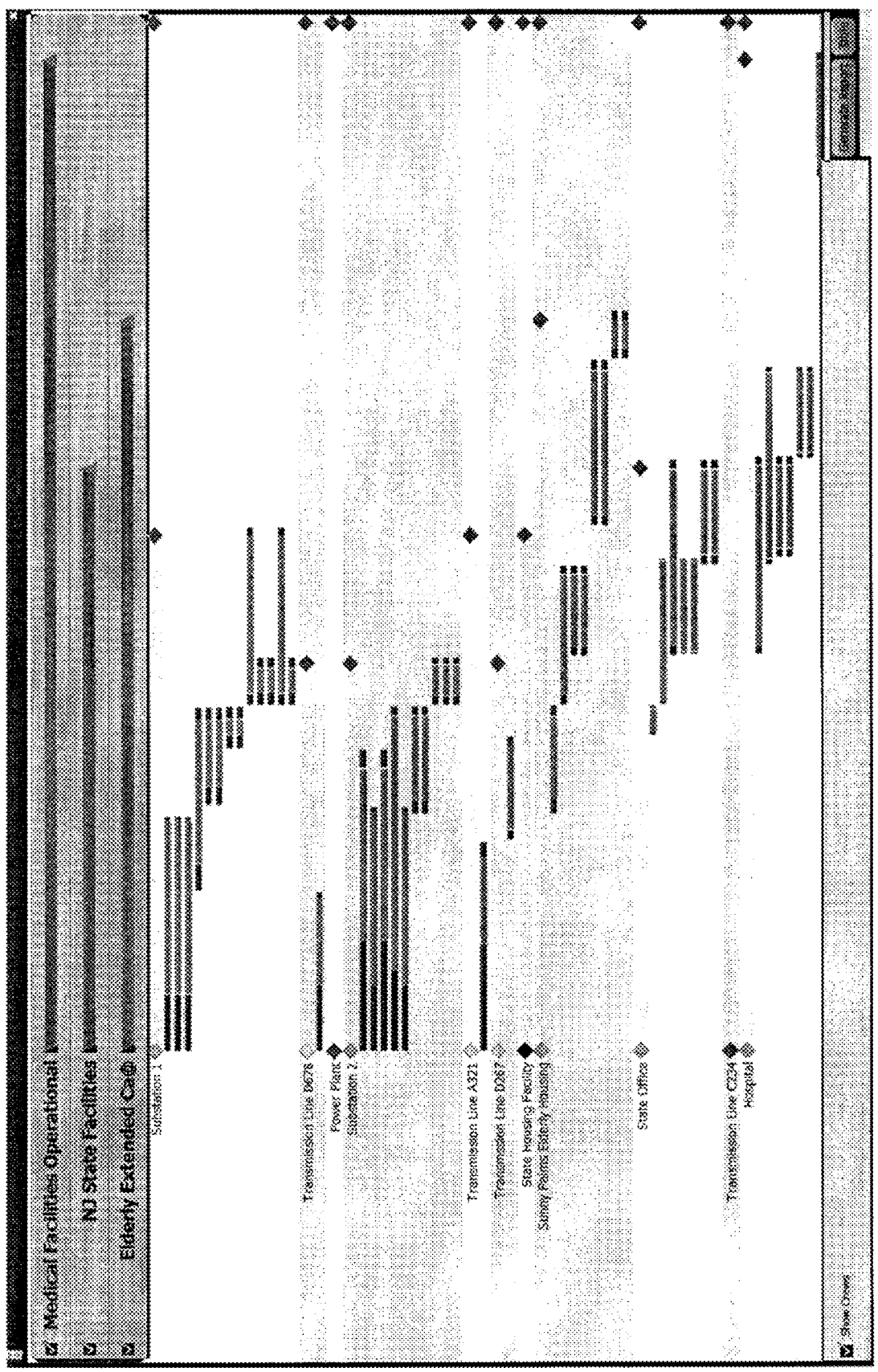
FIG. 10 represents a Gantt chart that illustrates the recovery process as determined by executing one exemplary embodiment of the method of these teachings.

13. In the exemplary embodiment, using a computer and the software program TACCS™ and using the same CI/KR and imposing the same disabling environmental conditions, simulate the recovery process taking into account the elements discussed in Steps 1-12 above. In the exemplary embodiment, using a computer and the software program TACCS™, prepare a Gantt chart that illustrates the recovery process as determined by the simulation, as well as summary tables presenting, inter alia, the times applied in the simulated recovery process as being required to restore the operability of specific CI/KR, the times applied in the simulated recovery process as being required to restore all of the CI/KR necessary to fulfill each of the various missions of the society or organization and the level of efficiency that results from that simulated recovery process. An exemplary GANTT chart is illustrated in FIG. 10.

14. In the exemplary embodiment, using a computer and the software program TACCS™ and using the same CI/KRs and simulating the same disabling environmental conditions, vary the locations of the Recovery Assets, and then simulate the application of the repositioned Recovery Assets and the same priorities determined as described above to restore operations to impaired CI/KR. In a variant of the foregoing, vary the amounts of Recovery Assets. Compare the results of the recovery operations in the second iteration of the simulation against those in the first iteration to determine whether there is any improvement in efficiency or any improvement in other criteria by which the implementation of such recovery may be evaluated. In the exemplary embodiment, using a computer and the software program TACCS™ and using the same CI/KR and simulating the same disabling environmental conditions, continue to vary the locations or amounts of the Recovery Assets as described above, and then make further simulated applications of the repositioned or different Recovery Assets and the same priorities determined as described above to restore operations to impaired CI/KR to determine the optimal positioning or amounts and nature of Recovery Assets with respect to the imposed disabling environmental conditions. If appropriate, further simulations may be made varying the availability and location of third party Recovery Assets to test the preferred prepositioning scheme against the effects of the loss of third party Recovery Assets. If appropriate, further simulations may be made varying the societal or organizational priorities to test whether a change in priorities would result in improved results using the selected criteria.

Although the system and method of these teachings as described above may be used in preparing for unintended occurrences, it may also be used to evaluate the various choices that a community or an organization may have in expending funds for purposes that may affect, for example, the amount, nature and locations of Recovery Assets; the size and other characteristics of roads and other transportation infrastructure to be used by Recovery Assets; and the susceptibility of CI/KR to one or more disabling environmental conditions. For example, with a budget of $1 million for expenditures for protection against the effects of unintended occurrences, a community or an organization may have different options available to it the consequences of which may have different effects on the ability of the community or organization to restore operability to CI/KR in the event of an unintended occurrence. Examples of choices for protection against, for example, coastal flooding that may be possible of comparative analysis for community or organizational benefit using the system and method of these teachings might include the construction of waterproof barriers around essential CI/KR, the introduction of automatic sump pumps into structures housing CI/KR, the burying of essential utility lines into sealed tunnels, adding dewatering pumps to prepositioned Recovery Assets and widening and strengthening access roads to accommodate heavy equipment. Using the system and method of these teachings would enable the various available options to be created in a computer simulation environment such as that afforded by TACCS™ and the results upon the recovery processes evaluated to obtain the most beneficial application of the funds.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Herein, various functions, functionalities and/or operations may be described as being performed by or caused by software program code to simplify description or to provide an example. However, those skilled in the art will recognize what is meant by such expressions is that the functions result from execution of the program code/instructions by a computing device as described above, e.g., including a processor, such as a microprocessor, microcontroller, logic circuit or the like.

Control and data information can be electronically executed and stored on computer-readable medium. Common forms of computer-readable (also referred to as computer usable) media can include, but are not limited to including, for example, a floppy disk, a flexible disk, a hard disk, magnetic tape, or any other magnetic medium, a CDROM or any other optical medium, punched cards, paper tape, or any other physical or paper medium, a RAM, a PROM, and EPROM, a FLASH-EPROM, or any other memory chip or cartridge, or any other non-transitory medium from which a computer can read. As stated in the USPTO 2005 Interim Guidelines for Examination of Patent Applications for Patent Subject Matter Eligibility, 1300 Off. Gaz. Pat. Office 142 (Nov. 22, 2005), on the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal.

Although these teachings have been described with respect to various embodiments, it should be realized these teachings are also capable of a wide variety of further and other embodiments within the spirit and scope of the appended claims.

What is claimed is:

1. A method for creating and testing procedures or policies, or combinations thereof, to respond to an event by implementing specified priorities of objectives using limited, specified resources to achieve a predetermined outcome, comprising the steps of:

(a) determining, using a computer, location information associated with the event;

(b) creating, using the computer, a base canvas using at least one data feed and the location information; wherein the base canvas includes imagery and at least one data layer which is overlain upon the base canvas, and which is correlated and geospatially aligned with the imagery according to the location information;

(c) identifying, using the computer, assets associated with the location information, each of the assets being characterized by asset vulnerabilities, asset dependencies, asset behavior, asset type, and asset conditions, said assets comprising physical entities associated by dependencies to create networks that achieve identified outputs, and having asset behaviors that identify recovery resource types needed to recover from various types of damage, number of recovery resources that can be concurrently applied to recovery effort, and time required for the recovery resources to complete recovery based on level of damage;

(d) associating, using the computer, the assets with the at least one data layer;

(e) aggregating, using the computer, data from the at least one data feed associated with the assets while a user is interfacing with the at least one data layer;

(f) identifying, using the computer, the asset dependencies, the asset vulnerabilities, and the asset behavior associated with the assets;

(g) selecting, using the computer, the assets associated with the event;

(h) changing, using the computer, asset conditions of selected assets based on the asset dependencies, the asset vulnerabilities, and the asset behaviors;

(i) determining changes in the asset conditions of the selected assets as a result of the event at an instance in event evolution based upon the location information, the at least one data layer, the asset conditions, the asset dependencies, the asset vulnerabilities and the asset behaviors, thereby performing an event driven simulation that provides effects of said changes on the networks and outputs of the networks that include one or more of the assets;

(j) updating, using the computer, the asset conditions of the selected assets based on the asset vulnerabilities, the asset dependencies, and the asset behaviors and results of step (i);

(k) updating, using the computer, the at least one data layer with information from the at least one data feed, updating the at least one data layer updates the base canvas;

(l) sending, using the computer, to the user, results of said steps (i), (j) and (k);

(l2) evolving the event to a next predetermined instance, and repeating steps (i)-(l) until the event has concluded, wherein the event driven simulation is being performed;

(m) identifying, using the computer, the type, the number, work rules, efficiency, and location of the recovery resources;

(m1) identifying, using the computer, and selecting, based upon a preselected preferred outcome, an order of priority in which missions that are dependent upon the recovery of damaged assets upon which affected networks of dependent assets are to be restored to operability based upon application of the recovery resources, the missions being situations or conditions that combine a number of assets with predetermined rules and determine an extent of asset recovery required;

(n) changing, using the computer, the asset conditions based on the asset dependencies, the asset vulnerabilities, the asset behaviors, and the application of the recovery assets;

(n1) determining changes in the asset conditions of the selected assets as a result of the application of recovery assets at an instance in evolution of time based upon the location information, the at least one data layer, the asset conditions, the asset dependencies, the asset vulnerabilities and the asset behaviors, by performing the event driven simulation that provides effects of said changes on the networks and the outputs of the networks that include one or more of the assets;

(n2) continuously updating, using the computer, the asset conditions based on the asset vulnerabilities, the asset dependencies, and the asset behaviors and results of said step (n1);

(n3) sending, using the computer, to the user, results of said step of simulating steps (n), (n1) and (n2);

(n4) repeating steps (n)-(n3) until the asset recovery has been completed;

(o) changing, using the computer, the priority to be applied to recovery of missions dependent upon affected assets from the selected assets and their associated networks to evaluate extent in improvement of overall recovery; and (p) repeating steps (m)-(o) until the affected assets have been restored in a manner that achieves the preselected preferred outcome given consequences of the event on the affected assets and availability and application of the recovery assets at a specified locations to restoration of such operations based upon a selected mission priority.

2. The method as in claim 1 further comprising the steps of:

recording, using the computer, the asset dependencies, the asset vulnerabilities, and the asset behaviors on a computer-readable medium;

grouping, using the computer, the assets according to the asset type;

automatically deriving, using the computer, asset-specific or type-specific data from the assets based on the asset type; and storing, using the computer, the asset-specific or type-specific data on a computer-readable medium.

3. The method as in claim 1 further comprising the step of:

applying, using the computer, visualization and control interface tools so that the assets appear to the user to be operating in the at least one data layer.

4. The method as in claim 1 further comprising the steps of:

identifying, using the computer, an alternate group of data feeds from the at least one data feed;

identifying and resolving, using the computer, conflicts among information received from the at least one data feed and the alternate group using predetermined algorithms;

identifying, using the computer, specific data feeds from the at least one data feed that contain analytical information; and superimposing, using the computer, the analytical information on the at least one data layer.

5. The method as in claim 1 further comprising the step of:

feeding, using the computer, the asset conditions, the asset dependencies, the asset vulnerabilities, and the asset behaviors to analytical tools to create modified asset conditions.

6. A non-transitory computer-readable medium containing instructions, the instructions causing a computer processor to:

(a) determine location information associated with an event;

(b) create a base canvas using at least one data feed and the location information; wherein the base canvas includes imagery and at least one data layer which is overlain upon the base canvas, and which is correlated and geospatially aligned with the imagery according to the location information;

(c) identify assets associated with the location information, each of the assets being characterized by asset vulnerabilities, asset dependencies, asset behavior, asset type, and asset conditions, said assets comprising physical entities associated by dependencies to create networks that achieve identified outputs, and having asset behaviors that identify recovery resource types needed to recover from various types of damage, a number of recovery resources that can be concurrently applied to recovery effort, and time required for the recovery resources to complete recovery based on level of damage; and the asset behavior comprising required inputs and outputs;

(d) associate the assets with the at least one data layer;

(e) aggregate data from the at least one data feed associated with the assets while a user is interfacing with the at least one data layer;

(f) identify the asset dependencies, the asset vulnerabilities, and the asset behavior associated with the assets;

(g) select the assets associated with the event;

(h) change asset conditions of selected assets based on the asset dependencies, the asset vulnerabilities, and the asset behaviors;

(i) determine changes in the asset conditions of the selected assets as a result of the event at an instance in event evolution based upon the location information, the at least one data layer, the asset conditions, the asset dependencies, the asset vulnerabilities and the asset behaviors, thereby performing an event driven simulation;

(j) update the asset condition of the selected assets based on the asset vulnerabilities, the asset dependencies, and the asset behaviors and results of step (i);

(k) update the at least one data layer with information from the at least one data feed; updating the at least one data layer updates the base canvas;

(l) send, to the user, results of said steps (i), (j) and (k);

(l2) evolve the event to a next predetermined instance, and repeat steps (i)-(l) until the event has concluded;

(m) identify, using the computer, the type, number, work rules, efficiency, and location of the recovery resources;

(m1) identify, using the computer, and select, based upon a preselected preferred outcome, an order of priority in which missions that are dependent upon recovery of damaged assets upon which the affected networks of dependent assets are to be restored to operability based upon application of the recovery resources, missions being situations or conditions that combine a number of assets with predetermined rules and determine an extent of asset recovery required;

(n) change, using the computer, the asset conditions based on the asset dependencies, the asset vulnerabilities, the asset behaviors, and the application of the recovery resources;

(n1) determine changes in the asset conditions of the selected assets as a result of the application of the recovery resources at an instance in evolution of time based upon the location information, the at least one data layer, the asset conditions, the asset dependencies, the asset vulnerabilities and the asset behaviors, by performing the event driven simulation that provides effects of said changes on the networks and the outputs of the networks that include one or more of the assets;

(n2) continuously update, using the computer, the asset conditions based on the asset vulnerabilities, the asset dependencies, and the asset behaviors and results of said step (n1);

(n3) send, using the computer, to the user, results of said step of simulating steps (n), (n1) and (n2);

(n4) repeat steps (n)-(n3) until the asset recovery has been completed;

(o) change, using the computer, the priority to be applied to recovery of the affected assets from the selected assets and their associated networks to evaluate extent in an improvement of an overall recovery; and (p) repeat steps (m)-(o) until the affected assets have been restored in a manner that achieves the preselected preferred outcome given consequences of the event on the affected assets and availability and application of the recovery assets at a specified locations to restoration of such operability.

7. A computer node having instructions, the instructions causing a computer processor to:

(a) determine location information associated with an event;

(b) create a base canvas using at least one data feed and the location information; wherein the base canvas includes imagery and at least one data layer which is overlain upon the base canvas, and which is correlated and geospatially aligned with the imagery according to the location information;

(c) identify assets associated with the location information, each of the assets being characterized by asset vulnerabilities, asset dependencies, asset behavior, asset type, and asset conditions, the assets comprising physical entities, the asset dependencies, the asset behavior comprising required inputs and outputs associated by dependencies to create networks that achieve identified outputs, and having asset behaviors that identify recovery resource types needed to recover from various types of damage, a number of recovery resources that can be concurrently applied to recovery effort, and time required for the recovery resources to complete recovery based on level of damage;

(d) associate the assets with the at least one data layer; (e) aggregate data from the at least one data feed associated with the assets while a user is interfacing with the at least one data layer;

(f) identify the asset dependencies, the asset vulnerabilities, and the asset behavior associated with the assets;
(g) select the assets associated with the event;
(h) change asset conditions of selected assets based on the asset dependencies, the asset vulnerabilities, and the asset behaviors;
(i) determine changes in the asset conditions of the selected assets as a result of the event at an instance in event evolution based upon the location information, the at least one data layer, the asset conditions, the asset dependencies, the asset vulnerabilities and the asset behaviors, thereby performing an event driven simulation that provides effects of said changes on the networks and outputs of the networks that include one or more of the assets;
(j) update the asset condition of the selected assets based on the asset vulnerabilities, the asset dependencies, and the asset behaviors and results of step (i);
(k) update the at least one data layer with information from the at least one data feed, updating the at least one data layer updates the base canvas;
(l) send, to the user, results of said steps (i), (j) and (k);
(l2) evolve the event to a next predetermined instance, and repeat steps (i)-(l) until the event has concluded, wherein the event driven simulation is performed;
(m) select, based upon a preselected preferred outcome, an order upon which affected networks of dependent assets are to be restored to operability based upon application of the recovery assets;
(m1) identify, using the computer, and select, based upon the preselected preferred outcome, an order of priority in which missions that are dependent upon recovery of damaged assets upon which the affected networks of dependent assets are to be restored to operability based upon application of the recovery resources, missions being situations or conditions that combine a number of assets with predetermined rules and determine an extent of asset recovery required;
(n) change, using the computer, the asset conditions based on the asset dependencies, the asset vulnerabilities, the asset behaviors, and the application of the recovery resources;
(n1) determine changes in the asset conditions of the selected assets as a result of the application of the recovery resources at an instance in evolution of time based upon the location information, the at least one data layer, the asset conditions, the asset dependencies, the asset vulnerabilities and the asset behaviors, by performing the event driven simulation that provides effects of said changes on the networks and the outputs of the networks that include one or more of the assets;
(n2) continuously update, using the computer, the asset condition based on the asset vulnerabilities, the asset dependencies, and the asset behaviors and results of said step (n1);
(n3) send, using the computer, to the user, results of said step of simulating steps (n), (n1) and (n2);
(n4) repeat steps (n)-(n3) until the asset recovery has been completed;
(o) change, using the computer, the priority to be applied to the recovery of the affected assets from the selected assets and their associated networks to evaluate an extent in an improvement of an overall recovery; and
(p) repeat steps (m)-(o) until the affected assets have been restored in a manner that achieves a the preselected preferred outcome given consequences of the event on the affected assets and availability and application of the recovery assets at a specified locations to restoration of such operability.

8. A communications network including a computer node having instructions, the instructions causing a computer processor to:
(a) determine location information associated with an event;
(b) create a base canvas using at least one data feed and the location information;
wherein the base canvas includes imagery and at least one data layer which is overlain upon the base canvas, and which is correlated and geospatially aligned with the imagery according to the location information;
(c) identify assets associated with the location information, each of the assets being characterized by asset vulnerabilities, asset dependencies, asset behavior, asset type, and asset conditions, the assets comprising physical entities, the asset dependencies, and the asset behavior comprising required inputs and outputs associated by dependencies to create networks that achieve identified outputs, and having asset behaviors that identify recovery resource types needed to recover from various types of damage, a number of recovery resources that can be concurrently applied to a recovery effort, and time required for the recovery resources to complete recovery based on level of damage;
(d) associate the assets with the at least one data layer;
(e) aggregate data from the at least one data feed associated with the assets while a user is interfacing with the at least one data layer;
(f) identify the asset dependencies, the asset vulnerabilities, and the asset behavior associated with the assets;
(g) select the assets associated with the event;
(h) change the asset conditions of selected assets based on the asset dependencies, the asset vulnerabilities, and the asset behaviors;
(i) determine changes in the asset conditions of the selected assets as a result of the event at an instance in event evolution based upon the location information, the at least one data layer, the asset conditions, the asset dependencies, the asset vulnerabilities and the asset behaviors, thereby performing an event-driven simulation;
(j) update the asset conditions of the selected assets based on the asset vulnerabilities, the asset dependencies, and the asset behaviors and results of step (i);
(k) update the at least one data layer with information from the at least one data feed, updating the at least one data layer updates the base canvas;
(l) send, to the user, results of said steps (i), (j) and (k);
(l2) evolve the event to a next predetermined instance, and repeat steps (i)-(l) until the event has concluded, wherein the event driven simulation is being performed;
(m) selecting, based upon a preselected preferred outcome, an order upon which affected networks of dependent assets are to be restored to operability based upon application of the recovery assets; and
(m1) identify, using the computer, and select, based upon a preselected preferred outcome, an order of priority in which missions that are dependent upon recovery of damaged assets upon which the affected networks of dependent assets are to be restored to operability based upon application of the recovery resources, missions being situations or conditions that combine a number of assets with predetermined rules and determine an extent of asset recovery required;

(n) change, using the computer, the asset conditions based on the asset dependencies, the asset vulnerabilities, the asset behaviors, and the application of the recovery resources;

(n2) determine changes in the asset conditions of the selected assets as a result of the application of the recovery resources at an instance in evolution of time based upon the location information, the at least one data layer, the asset conditions, the asset dependencies, the asset vulnerabilities and the asset behaviors, by performing the event driven simulation that provides effects of said changes on the networks and the outputs of the networks that include one or more of the assets;

(n2) continuously update, using the computer, the asset conditions based on the asset vulnerabilities, the asset dependencies, and the asset behaviors and results of said step (n1);

(n3) send, using the computer, to the user, results of said step of simulating steps (n), (n1) and (n2);

(n4) repeat steps (n)-(n3) until the asset recovery has been completed;

(o) change, using the computer, a priority to be applied to the recovery of affected assets from the selected assets and their associated networks to evaluate an extent in an improvement of an overall recovery; and (p) repeat steps (m)-(o) until the affected assets have been restored in a manner that achieves the preselected preferred outcome given consequences of the event on the affected assets and availability and application of the recovery assets at a specified locations to restoration of such operability.

* * * * *